United States Patent
Miyamoto et al.

(10) Patent No.: US 10,404,889 B2
(45) Date of Patent: Sep. 3, 2019

(54) PRINTING SYSTEM AND METHOD OF CONTROLLING PRINTING SYSTEM THAT ALLOW A USER OF A MOBILE TERMINAL TO PRINT TO AN IMAGE FORMING APPARATUS USING THE MOBILE TERMINAL, AND A SERVICE PROVIDER TO CHARGE THE USER FOR PRINTING

(71) Applicant: CANON KABUSHIKI KAISHA, Tokyo (JP)

(72) Inventors: Takayuki Miyamoto, Kawasaki (JP); Kazuhiko Okazawa, Yokohama (JP); Yuuji Takayama, Yokohama (JP); Hikaru Uchidate, Yokohama (JP); Munehito Kurata, Suntou-gun (JP); Hiroshi Hagiwara, Suntou-gun (JP); Masayuki Takao, Yokohama (JP); Masaaki Nakamura, Yokohama (JP); Katsuhiko Shinjo, Machida (JP); Senju Sato, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 15/308,571

(22) PCT Filed: Apr. 16, 2015

(86) PCT No.: PCT/JP2015/062319
§ 371 (c)(1),
(2) Date: Nov. 2, 2016

(87) PCT Pub. No.: WO2015/174233
PCT Pub. Date: Nov. 19, 2015

(65) Prior Publication Data
US 2017/0070642 A1 Mar. 9, 2017

(30) Foreign Application Priority Data
May 13, 2014 (JP) .................................. 2014-099830

(51) Int. Cl.
*G06F 3/12* (2006.01)
*H04N 1/34* (2006.01)
(Continued)

(52) U.S. Cl.
CPC ................ *H04N 1/34* (2013.01); *B41J 29/38* (2013.01); *G06F 3/1204* (2013.01); *G06F 3/126* (2013.01);
(Continued)

(58) Field of Classification Search
CPC .. H04N 1/34; H04N 1/00204; H04N 1/32523; H04N 1/00344; H04N 1/4406;
(Continued)

(56) References Cited

U.S. PATENT DOCUMENTS 7,034,952 B2   4/2006   Okuda et al.
7,266,590 B2   9/2007   Nakaoka et al.
(Continued)

FOREIGN PATENT DOCUMENTS

CN   1342285 A    3/2002
CN   101334715 A   12/2008
(Continued)

OTHER PUBLICATIONS

Search Report dated Nov. 28, 2017, issued in corresponding European Patent Application No. 15792199.0.
(Continued)

*Primary Examiner* — Kent Yip
(74) *Attorney, Agent, or Firm* — Venable LLP

(57) ABSTRACT

A method of controlling a printing system includes displaying, in a mobile terminal, a setting region for inputting a print setting for print data, and a search region for inputting a search condition for image forming apparatus candidates, of a plurality of image forming apparatuses, for executing printing, and searching, in a management system, for one or
(Continued)

more image forming apparatuses, out of the plurality of image forming apparatuses, in accordance with the search condition input in the search region of the screen, and displaying display content that associates information of the image forming apparatuses with charge information for when the print data is printed by the image forming apparatuses, respectively, on a screen that includes a selection region by which it is possible to select the printing target, out of the one or more image forming apparatuses found in the searching.

20 Claims, 27 Drawing Sheets

(51) Int. Cl.
- *B41J 29/38* (2006.01)
- *H04N 1/00* (2006.01)
- *H04N 1/32* (2006.01)
- *H04N 1/44* (2006.01)

(52) U.S. Cl.
CPC .......... *G06F 3/1226* (2013.01); *G06F 3/1288* (2013.01); *G06F 3/1292* (2013.01); *H04N 1/00204* (2013.01); *H04N 1/00344* (2013.01); *H04N 1/00832* (2013.01); *H04N 1/32523* (2013.01); *H04N 1/344* (2013.01); *H04N 1/346* (2013.01); *H04N 1/4406* (2013.01); *H04N 2201/006* (2013.01); *H04N 2201/0039* (2013.01); *H04N 2201/0094* (2013.01)

(58) Field of Classification Search
CPC .... H04N 1/346; H04N 1/344; H04N 1/00832; H04N 2201/0094; H04N 2201/006; H04N 2201/0039; G06F 3/1292; G06F 3/126; G06F 3/1226; G06F 3/1204; G06F 3/1288; B41J 29/38

See application file for complete search history.

(56) References Cited

U.S. PATENT DOCUMENTS

| | | | |
|---|---|---|---|
| 7,370,090 B2 | 5/2008 | Nakaoka et al. | |
| 7,379,914 B2 | 5/2008 | Aoki et al. | |
| 7,441,003 B1 | 10/2008 | Takeda et al. | |
| 7,461,138 B2 | 12/2008 | Mukaiyama et al. | |
| 7,606,761 B2 | 10/2009 | Aoki et al. | |
| 7,870,287 B2 | 1/2011 | Nakaoka et al. | |
| 8,264,720 B2 | 9/2012 | Sugiyama | |
| 8,515,981 B2 | 8/2013 | Nakamoto et al. | |
| 8,593,677 B2 | 11/2013 | Nishimi et al. | |
| 8,941,850 B2 | 1/2015 | Sato | |
| 8,985,580 B2 | 3/2015 | Ozaki | |
| 2001/0003180 A1* | 6/2001 | Sakai .................. G06Q 20/102 705/40 |
| 2002/0138557 A1 | 9/2002 | Mukaiyama et al. | |
| 2007/0093265 A1 | 4/2007 | Krykun | |
| 2009/0036056 A1* | 2/2009 | Oshima ............... H04M 1/7253 455/41.3 |
| 2012/0038948 A1 | 2/2012 | Park | |
| 2012/0072376 A1 | 3/2012 | Akiyama et al. | |
| 2012/0215591 A1 | 8/2012 | Akiyama et al. | |
| 2013/0027741 A1 | 1/2013 | Liu | |
| 2013/0085968 A1 | 4/2013 | Schultz et al. | |

FOREIGN PATENT DOCUMENTS

| | | |
|---|---|---|
| JP | 11-129589 A | 5/1999 |
| JP | 2001-306828 A | 11/2001 |
| JP | 2002-007443 A | 1/2002 |
| JP | 2002-41815 A | 2/2002 |
| JP | 2002-055913 A | 2/2002 |
| JP | 2002-169671 A | 6/2002 |
| JP | 2003-280869 A | 10/2003 |
| JP | 2005-084783 A | 3/2005 |
| JP | 2006-195811 A | 7/2006 |
| JP | 2007-34539 A | 2/2007 |
| JP | 2010-152710 A | 7/2010 |
| JP | 2012-68699 A | 4/2012 |
| JP | 2012-138071 A | 7/2012 |
| JP | 2013-214808 A | 10/2013 |
| JP | 2014-068304 A | 4/2014 |
| RU | 2469379 C2 | 12/2012 |

OTHER PUBLICATIONS

Office Action dated Aug. 10, 2017, in Singapore Patent Application No. 11201609303S.
Office Action dated Feb. 2, 2018, issued in Russian Application No. 2016148646.
Office Action dated Sep. 19, 2017, in Japanese Patent Application No. 2014-099830.
Office Action dated Oct. 9, 2018, issued in Chinese Patent Application No. 201580026345.7.

* cited by examiner

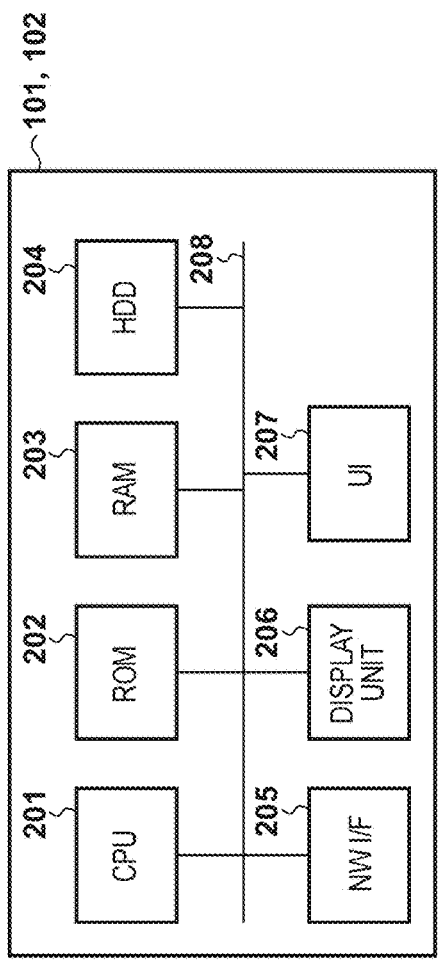
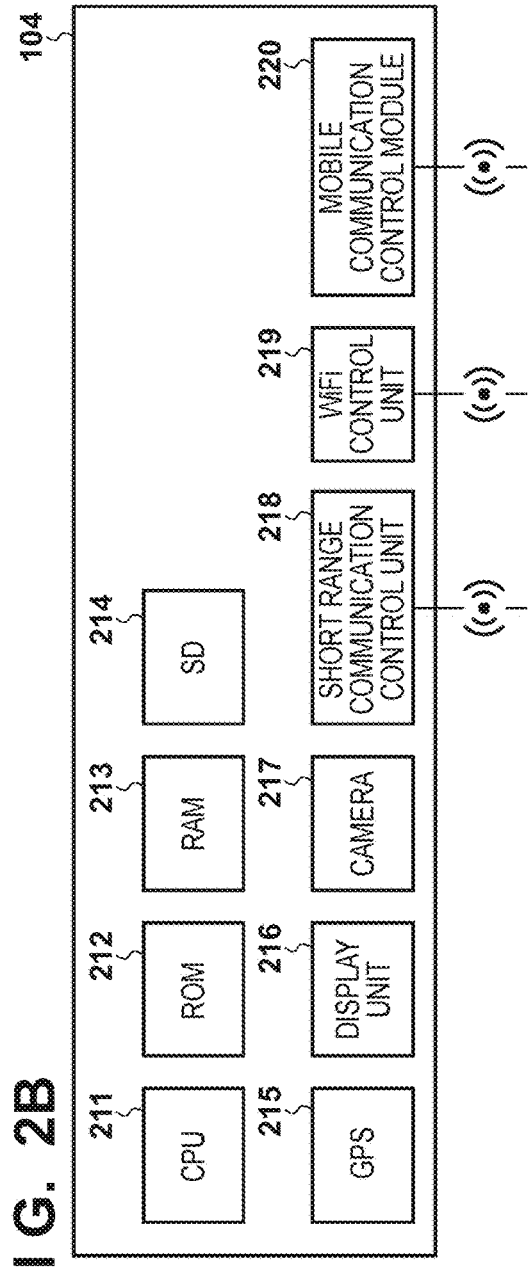

FIG. 5AA

| 501 | 502 | 503 | 504 | 505 | 506 | 507 | 508 |
|---|---|---|---|---|---|---|---|
| DEVICE IDENTIFIER | DEVICE NAME | MODEL NAME | LOCATION INFORMATION | ADMINISTRATOR INFORMATION | FUNCTION INFORMATION | FUNCTION STATUS | COST INFORMATION |
| DI0001 | Dev0001 | FFPOP-SSS01 | LONGITUDE:XXX LATITUDE:YYY ALTITUDE:ZZZ | CCC FLOWER SHOP | COLOR MONOCHROME DOUBLE-SIDED SINGLE-SIDED | USEABLE USEABLE LACKS FUNCTION USEABLE | SAME CONFIGURATION AS FIG. 5AF |
| DI0002 | printer0011 | OGS-DEE-A10 | LONGITUDE:XXX LATITUDE:YYY ALTITUDE:ZZZ | OWE DEPARTMENT STORE | COLOR MONOCHROME DOUBLE-SIDED SINGLE-SIDED | APPARATUS STOPPED | SAME CONFIGURATION AS FIG. 5AF |
| DI0003 | MFP11 | OFRS-SQQQ1 | LONGITUDE:XXX LATITUDE:YYY ALTITUDE:ZZZ | YAMADA TARO | COLOR MONOCHROME DOUBLE-SIDED SINGLE-SIDED | CANNOT USE USEABLE USEABLE USEABLE | SAME CONFIGURATION AS FIG. 5AF |
| DI0004 | printer1 | htwst09 | LONGITUDE:XXX LATITUDE:YYY ALTITUDE:ZZZ | EESS | COLOR MONOCHROME DOUBLE-SIDED SINGLE-SIDED | USEABLE USEABLE USEABLE USEABLE | SAME CONFIGURATION AS FIG. 5AF |

| 511 | 512 | 513 | 514 | 515 | 516 | 517 |
|---|---|---|---|---|---|---|
| JOB IDENTIFIER | USER IDENTIFIER | DEVICE IDENTIFIER | IMAGE IDENTIFIER | STATUS | ISSUANCE DATE | COMPLETION DATE |
| JI0001 | UI0001 | DI0001 | II0001,II0003,II0004 | EXECUTED (AWAITING PAYMENT) | 2014/1/3 | |
| JI0002 | UI0001 | DI0002 | II0002 | PAYMENT COMPLETED | 2014/1/3 | 2014/1/3 |
| JI0003 | UI0003 | DI0001 | II0101 | NOT YET EXECUTED | 2014/1/5 | |
| JI0004 | UI0005 | DI0003 | II0501 | NOT YET EXECUTED | 2014/1/6 | |

510

F I G. 5AC

| 521 USER IDENTIFIER | 522 USER NAME | 523 PASSWORD | 524 MOBILE TERMINAL IDENTIFIER | 525 MOBILE TERMINAL LOCATION INFORMATION | 526 CREDIT INFORMATION | 527 NOTIFICATION DESTINATION INFORMATION |
|---|---|---|---|---|---|---|
| UI0001 | aaa | wsjebt-1 | TI0001 | LONGITUDE:XXX LATITUDE:YYY ALTITUDE:ZZZ | 0294-2739-2913 | aaa@mm.jp |
| UI0002 | bbb | jdnhapw001 | TI0002 | LONGITUDE:XXX LATITUDE:YYY ALTITUDE:ZZZ | 1154-5946-9754 | bbb@dod.ne.jp |
| UI0003 | cccc | kabgaitn32 | TI0001 | LONGITUDE:XXX LATITUDE:YYY ALTITUDE:ZZZ | 5185-9547-5626 | cccc@eee.ne.jp |
| UI0005 | ddd | lantoant44 | TI0004 | LONGITUDE:XXX LATITUDE:YYY ALTITUDE:ZZZ | 1111-8888-9999 | ddd@waw.ne.jp |

520

F I G. 5AD

| DEVICE IDENTIFIER ~531 | FUNCTION ~532 | FEE [¥] ~533 |
|---|---|---|
| DI0001 | COLOR<br>MONOCHROME<br>DOUBLE-SIDED<br>SINGLE-SIDED | 10<br>5<br>-<br>2 |
| DI0002 | COLOR<br>MONOCHROME<br>DOUBLE-SIDED<br>SINGLE-SIDED | 15<br>10<br>5<br>5 |
| DI0003 | COLOR<br>MONOCHROME<br>DOUBLE-SIDED<br>SINGLE-SIDED | 15<br>5<br>2<br>2 |
| DI0004 | COLOR<br>MONOCHROME<br>DOUBLE-SIDED<br>SINGLE-SIDED | 5<br>1<br>1<br>1 |

~530

F I G. 5AE

| MODEL NAME ~541 | COST INFORMATION ~542 |
|---|---|
| FFPOP-SSS01 | SAME CONFIGURATION AS FIG. 5AF |
| FFPOP-SSS02 | SAME CONFIGURATION AS FIG. 5AF |

| FEE ITEM | CLASSIFICATION | UNIT PRICE/ COEFFICIENT |
|---|---|---|
| TONER CONSUMPTION AMOUNT | C | 10[¥/mg] |
| | M | 15[¥/mg] |
| | Y | 10[¥/mg] |
| | K | 5[¥/mg] |
| PAPER TYPE | L | 10[¥/SHEET] |
| | A3 | 10[¥/SHEET] |
| | A4 | 10[¥/SHEET] |
| DOUBLE-SIDED PRINTING | SINGLE-SIDED | 1[COEFFICIENT] |
| | DOUBLE-SIDED | 1.5[COEFFICIENT] |
| DEPRECIATION COST UNIT PRICE | MAIN BODY | 1[¥] |
| MEDIA TYPE COEFFICIENT | NORMAL PAPER | 1[COEFFICIENT] |
| | THICK PAPER | 1.1[COEFFICIENT] |
| | GLOSSY PAPER | 1.1[COEFFICIENT] |
| | OHP | 1.1[COEFFICIENT] |
| MEDIA SIZE COEFFICIENT | L | 1.2[COEFFICIENT] |
| | A5 OR SMALLER | 1.2[COEFFICIENT] |
| | A4 | 1.1[COEFFICIENT] |
| | A3 | 1[COEFFICIENT] |
| MODE | Color | 1[COEFFICIENT] |
| | Mono | 0.9[COEFFICIENT] |
| CONTINUOUS PRINTING SHEET NUMBER | 1 | 1.5[COEFFICIENT] |
| | 2-4 | 1.3[COEFFICIENT] |
| | 5-9 | 1.1[COEFFICIENT] |
| | 10- | 1[COEFFICIENT] |

F I G. 5BA

| USER IDENTIFIER | JOB IDENTIFIER | FEE [¥] | PAYMENT STATUS |
|---|---|---|---|
| UI0001 | JI0001 | 100 | NOT YET COMPLETE |
| UI0001 | JI0002 | 200 | COMPLETE |
| UI0003 | JI0003 | 100 | NOT YET COMPLETE |
| UI0005 | JI0004 | 150 | NOT YET COMPLETE |

F I G. 5BB

| USER IDENTIFIER | USER NAME | PASSWORD | CREDIT INFORMATION |
|---|---|---|---|
| UI0001 | aaa | wsjebt-1 | 0294-2739-2913-3922 |
| UI0002 | bbb | idnhapw001 | 1154-5946-9754-9541 |
| UI0003 | cccc | kabgaitn32 | 5185-9547-5626-9745 |
| UI0005 | ddd | lantoant44 | 1111-8888-9999-8888 |

F I G. 5C

| IMAGE IDENTIFIER | DATA NAME | FILE TYPE | SIZE [KB] |
|---|---|---|---|
| II0001 | OOAS | .txt | 10 |
| II0002 | RITHS | .jpg | 1000 |
| II0003 | OOAT | .txt | 15 |
| II0004 | OOAU | .txt | 10 |
| II0101 | ryokou | .bmp | 1500 |

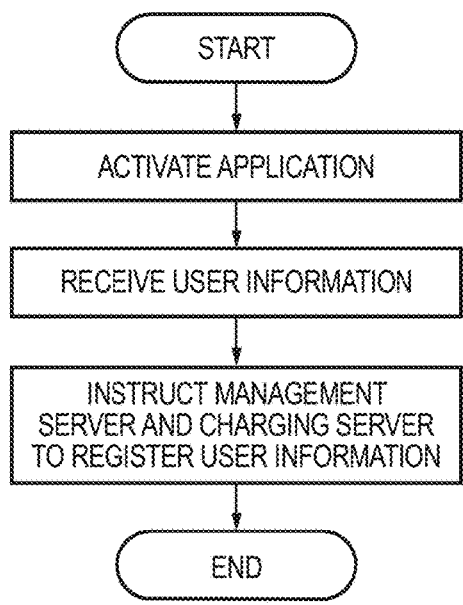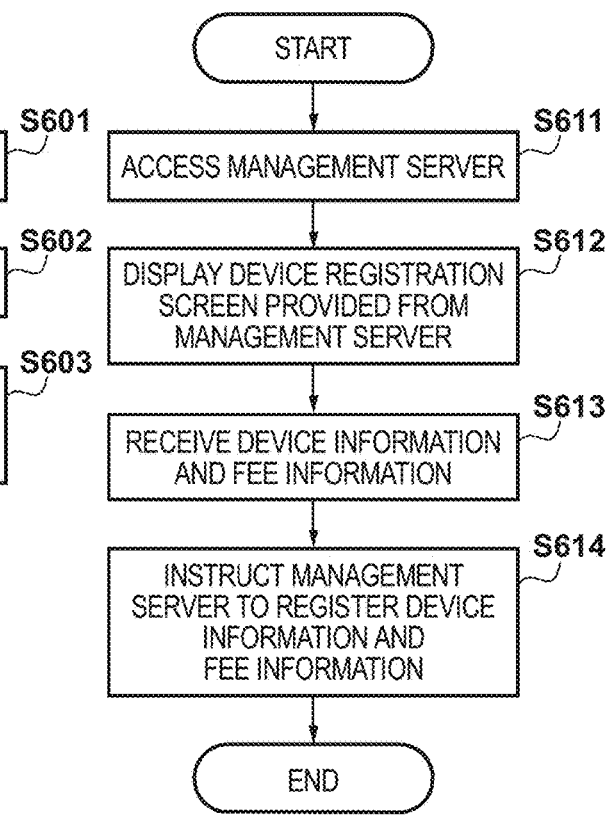
FIG. 6A
FIG. 6B

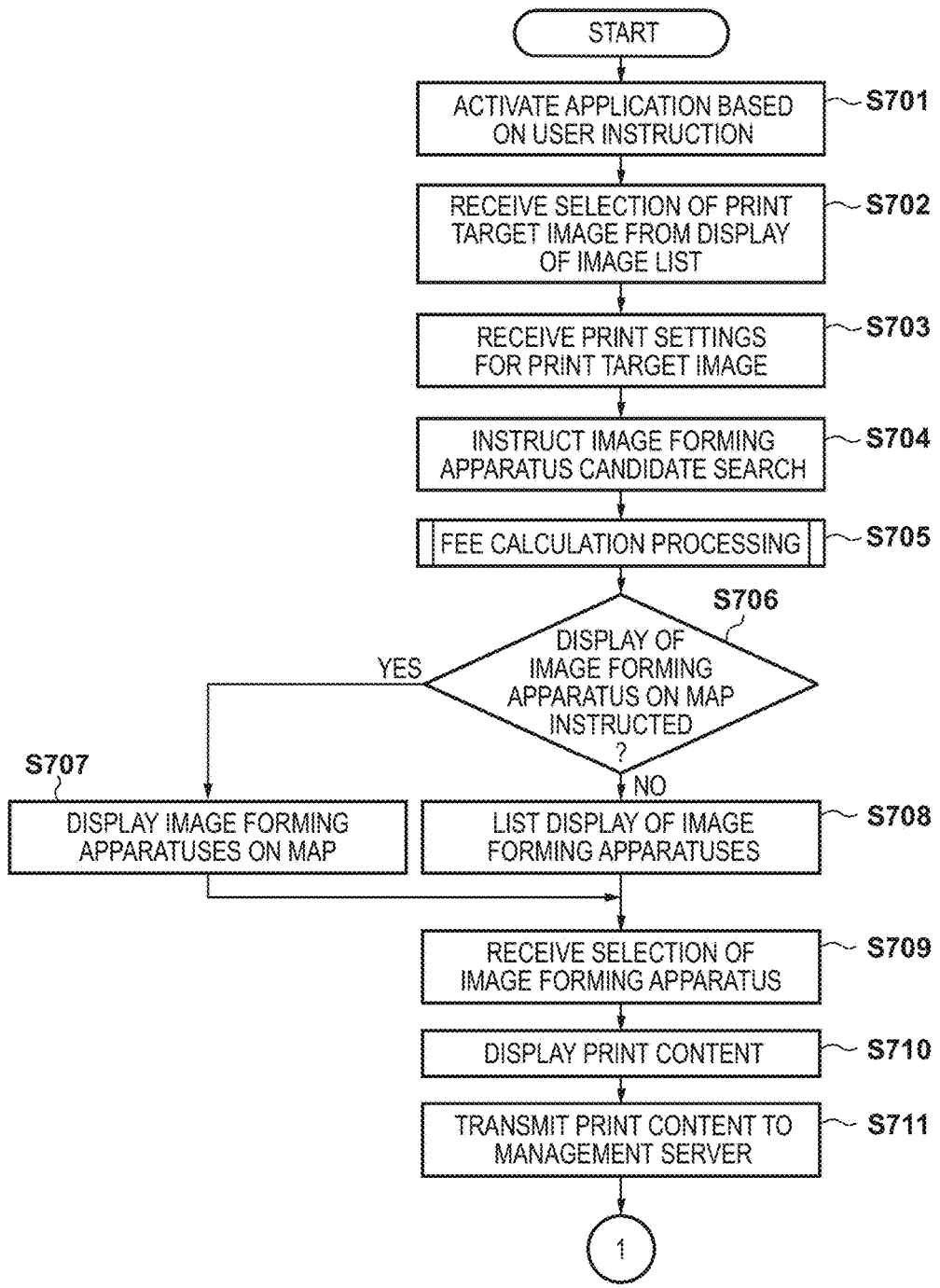

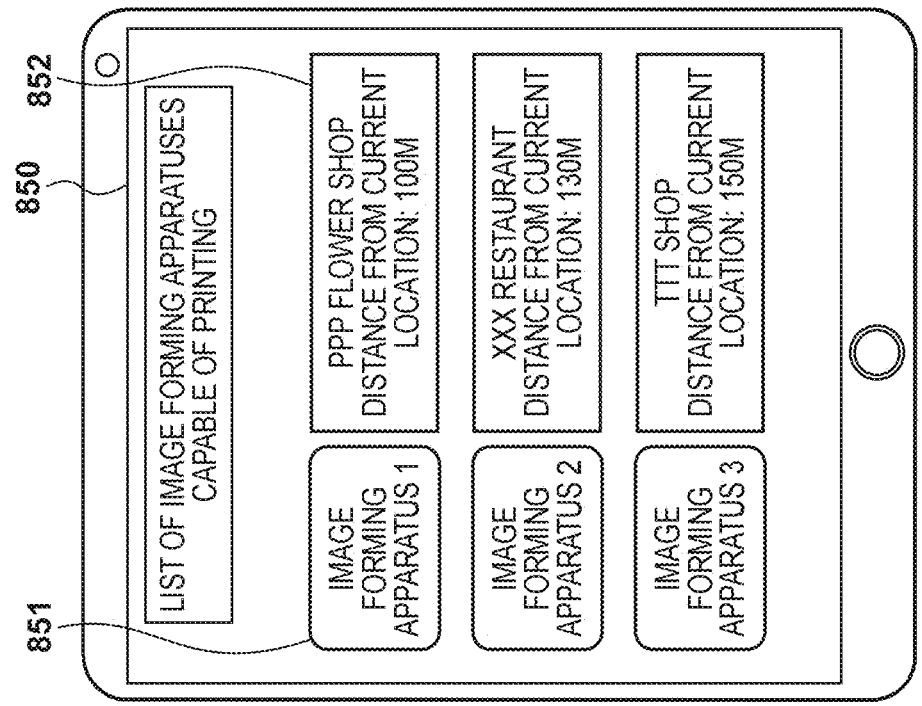
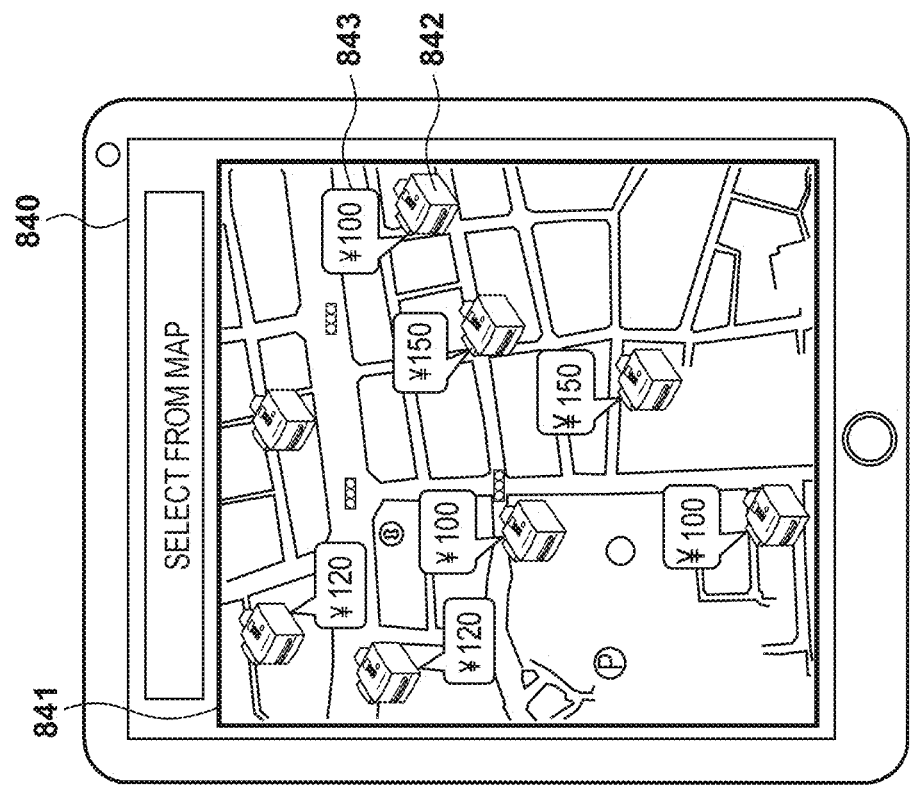

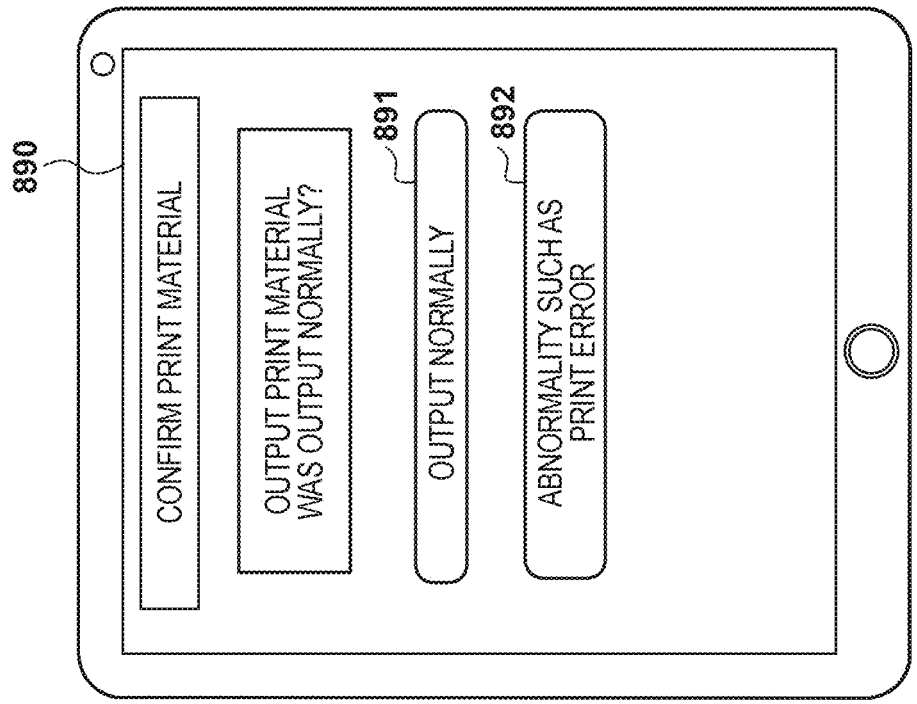
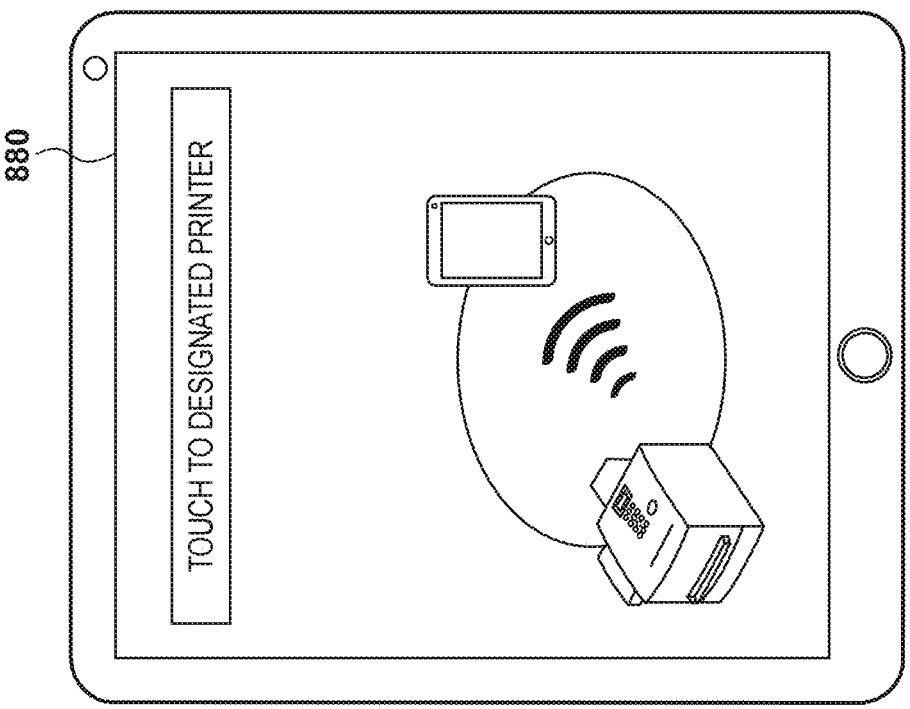

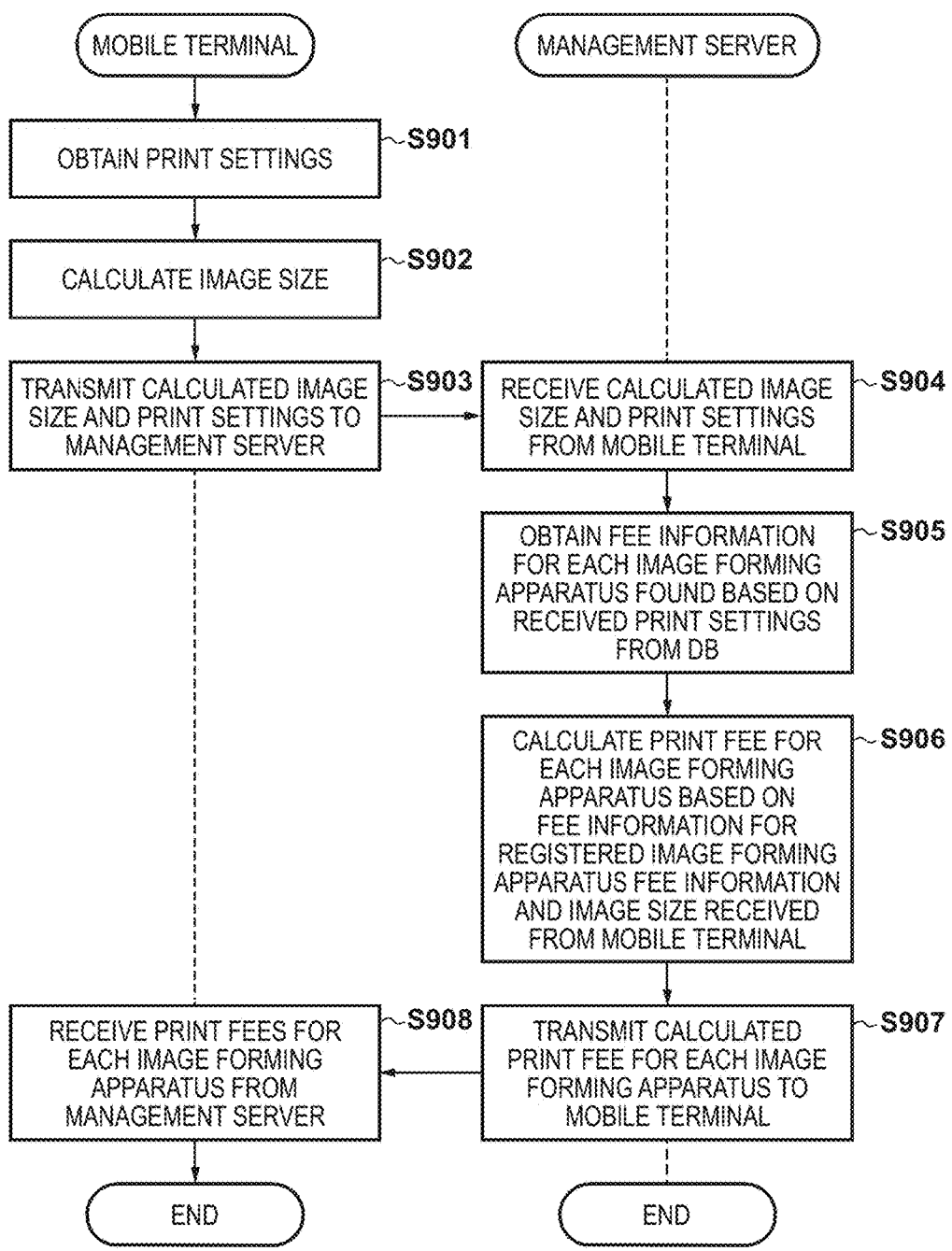

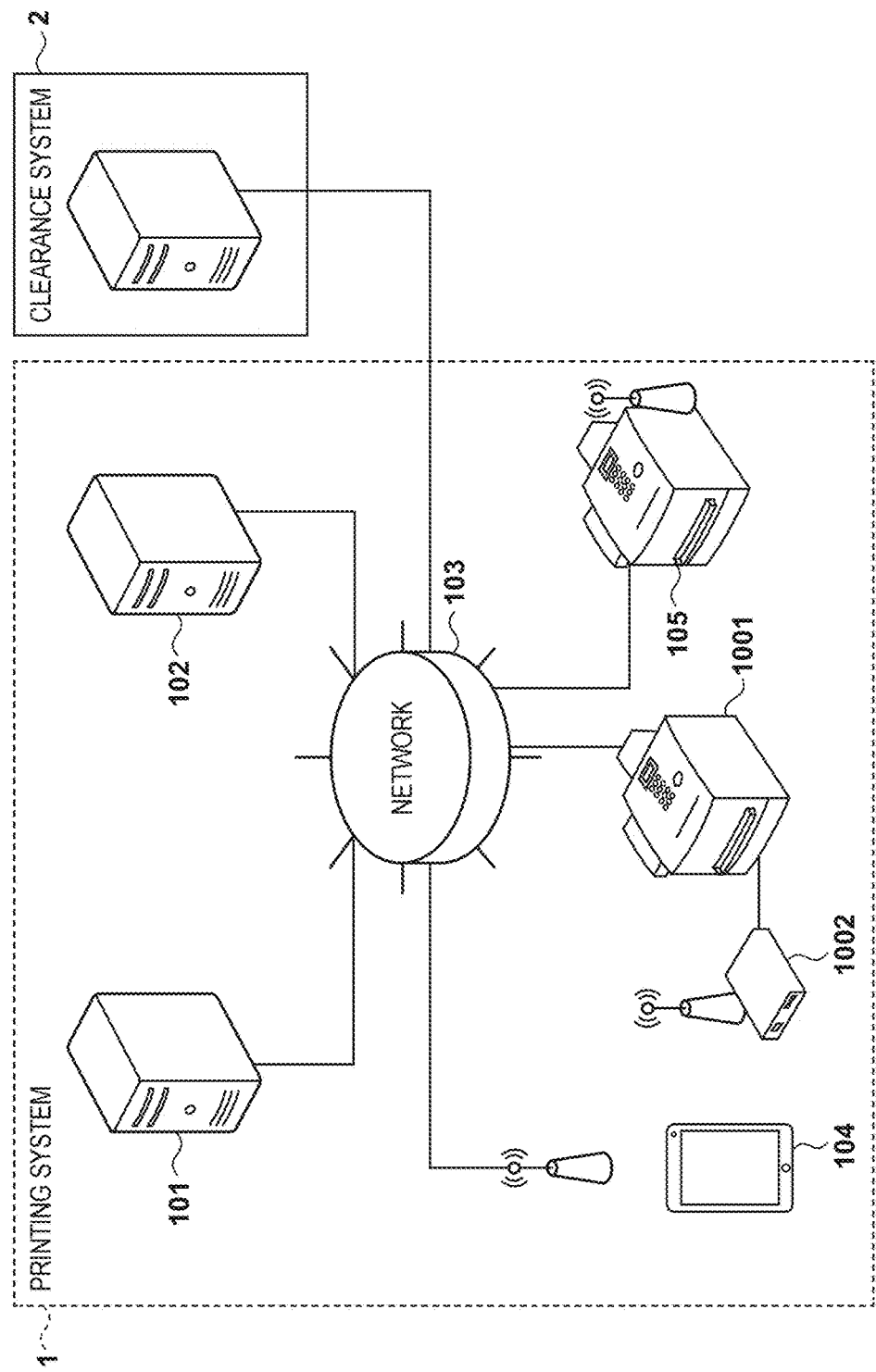

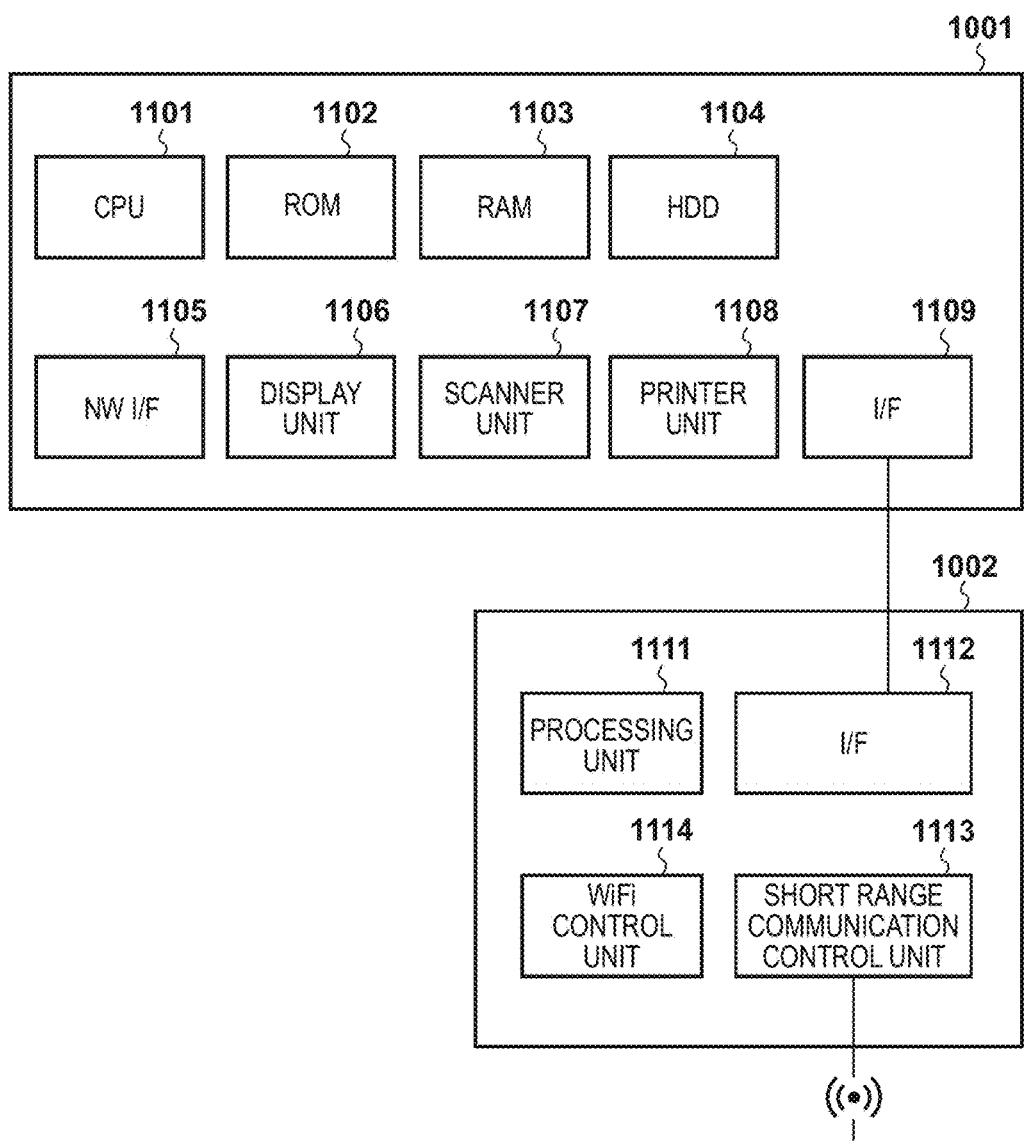

F I G. 13A

| STEP | MOBILE TERMINAL | MANAGEMENT SYSTEM |
|---|---|---|
| 1. PRINT SPECIFICATION INSTRUCTION (FILE, PAPER, COPIES, PRINT SETTINGS (DOUBLE-SIDED), ETC.) | ○ | |
| 2. IMAGE SIZE CALCULATION BASED ON DATA ANALYSIS | ○ | |
| 3. PRINTER SEARCH | | ○ |
| 4. COLORING MATERIAL CALCULATION | | ○ |
| 5. CHARGE FOR DEPRECIATION CALCULATION | | ○ |
| 6. FEE/PROFIT CALCULATION | | ○ |
| 7. FEE NOTIFICATION | | ○ |
| 8. PRINTER SELECTION | ○ | |
| 9. PRINT INSTRUCTION | ○ | |
| 10. TRANSMIT DATA TO PRINTER | ○ | |
| 11. CONFIRM PRINT | ○ | |
| 12. CHARGE | | ○ |

FIG. 13B

| STEP | MOBILE TERMINAL | MANAGEMENT SYSTEM |
|---|---|---|
| 1. PRINT SPECIFICATION INSTRUCTION (FILE, PAPER, COPIES, PRINT SETTINGS (DOUBLE-SIDED), ETC.) | ○ | |
| 2. IMAGE SIZE CALCULATION BASED ON DATA ANALYSIS | | ○ (CASE WHERE PRINT TARGET DATA IS ON SYSTEM SIDE) |
| 3. PRINTER SEARCH | | ○ |
| 4. COLORING MATERIAL CALCULATION | | ○ |
| 5. CHARGE FOR DEPRECIATION CALCULATION | | ○ |
| 6. FEE/PROFIT CALCULATION | | ○ |
| 7. FEE NOTIFICATION | | ○ |
| 8. PRINTER SELECTION | ○ | |
| 9. PRINT INSTRUCTION | ○ | |
| 10. TRANSMIT DATA TO PRINTER | | ○ (CASE WHERE PRINT TARGET DATA IS ON SYSTEM SIDE) |
| 11. CONFIRM PRINT | ○ | |
| 12. CHARGE | | ○ |

PRINTING SYSTEM AND METHOD OF CONTROLLING PRINTING SYSTEM THAT ALLOW A USER OF A MOBILE TERMINAL TO PRINT TO AN IMAGE FORMING APPARATUS USING THE MOBILE TERMINAL, AND A SERVICE PROVIDER TO CHARGE THE USER FOR PRINTING

This application claims the benefit of Japanese Patent Application No. 2014-099830, filed on May 13, 2014, which is hereby incorporated by reference in its entirety.

TECHNICAL FIELD

The present invention relates to a printing system for printing via a network, and to a method of controlling a printing system.

BACKGROUND ART

Conventionally, print services for printing, in accordance with a request of a customer (a user), an image that the customer designates at a store have been provided.

Also, when such print services are provided, a service by which the printing is ordered via the Internet using cloud computing techniques where printing can be performed by obtaining image data on a network is provided. Furthermore, print services for printing via the Internet are not limited to those in which personal computers, or the like, are installed at each location, and it has become possible to use these services from a mobile terminal, such as a smart phone (refer to Japanese Patent Laid-Open No. 2012-138071).

In conjunction with the spread of mobile terminals, such as smart phones, there is a demand for the ability to easily print electronic data, such as images that the user captured using a camera installed on the mobile terminal at an external location, and images, documents, or the like, that are saved on a mobile terminal, as well as electronic data, such as images or documents obtained by accessing the cloud from the mobile terminal. Also, users who do not own a printer are increasing, and so there is high demand for being able to use print services via networks, as described above.

Meanwhile, it cannot be said that, currently, the spread of stores capable of providing print services, as described above, (hereafter referred to as service providers) is sufficient, and locations at which such print services can be used are limited. One of the reasons for this may be that there is difficulty in introducing print services due to the required effort and investment. Furthermore, there is also the effort of management of printing costs after service providers start to provide the print services. Specifically, the introduction and maintenance/management in providing print services has not, conventionally, been sufficiently easy.

Furthermore, on the side of the user of the services (hereafter referred to as the service user or user), there is an effort in actually searching out a store that can provide print services (i.e., an image forming apparatus that can be used), and an effort associated with payment using cash when using the print services. Thus, convenience on the service user side has not been sufficient.

SUMMARY OF INVENTION

In consideration of these circumstances, a printing system and a method of controlling a printing system capable of making it easier for service providers that provide print services via a network to spread more easily are provided. Also, a printing system and a method of controlling a printing system by which a service user can use print services easily are provided.

According to one aspect, the present invention provides a method of controlling a printing system in which a mobile terminal and a plurality of image forming apparatuses are connectable to a management system and a charging system via a network, the method comprising a step of, in the management system, authenticating that a user of the mobile terminal is a registered user of the printing system, a step of, in the charging system, confirming that clearance processing of the user of the mobile terminal is possible, a step of, in the mobile terminal, instructing to the management system, a search condition for an image forming apparatus that is caused to print print data that is a printing target, a search step of, in the management system, searching for one or more image forming apparatuses from out of the plurality of image forming apparatuses in accordance with the instructed search condition, a display step of, in the mobile terminal, displaying display content that associates information of the one or more image forming apparatuses with charge information for when the print data is printed on the one or more image forming apparatuses, respectively, on a screen that is a screen that includes a selection region by which it is possible to select a printing target from out of the one or more image forming apparatuses searched for in the search step, a step of, in the mobile terminal, transmitting to the management system a print instruction that includes information of an image forming apparatus selected as the printing target in the selection region, a step of, in the management system, issuing a print job including information by which it is at least possible to identify the print instruction that is for the image forming apparatus selected as the printing target if the clearance processing of the user is possible, an outputting step of, in the image forming apparatus selected as the printing target, outputting printed material by printing the print data based on the issued print job, and a requesting step of, in the management system, making a request for clearance processing based on the charge information to the charging system after the outputting of the printed material.

According to another aspect, the present invention provides a method of controlling a printing system in which a mobile terminal and a plurality of image forming apparatuses are connectable to a management system and a charging system via a network, the method comprising a step of, in the management system, authenticating that a user of the mobile terminal is a registered user of the printing system, a step of, in the charging system, confirming that clearance processing of the user of the mobile terminal is possible, a step of, in the mobile terminal, displaying on a screen a setting region for inputting a print setting for print data that is a printing target, and a search region for inputting a search condition for image forming apparatus candidates for executing printing, a calculation step of, in the mobile terminal, calculating, based on the print setting, an image size for when the print data that is the printing target is printed, a search step of, in the management system, searching for one or more image forming apparatuses from out of the plurality of image forming apparatuses in accordance with the search condition input in the search region, a step of, in the management system, calculating, based on at least the image size calculated in the calculation step, charge information for when the print data is printed by the print setting for each of the one or more image forming apparatus searched for in the search step, a step of, in the mobile terminal, displaying display content that associates information of the one or more image forming apparatuses with charge information for when the print data is printed on the one or more image forming apparatuses, respectively, on a screen that is a screen that includes a selection region by which it is possible to select an image forming apparatus to be a printing target from out of the one or more image forming apparatuses searched for in the search step, a step of, in the mobile terminal, transmitting to the management system a print instruction that includes information of an image forming apparatus selected as the printing target in the selection region, a step of, in the management system, issuing a print job including information by which it is at least possible to identify the print instruction that is for the image forming apparatus selected as the printing target if the clearance processing of the user is possible, an outputting step of, in the image forming apparatus selected as the printing target, outputting printed material by printing the print data, by the print setting input in the setting region, based on the issued print job, and a requesting step of, in the management system, making a request for clearance processing based on the charge information to the charging system after the outputting of the printed material.

According to yet another aspect, the present invention provides a method of controlling a printing system comprising a plurality of image forming apparatuses each having a short range communication means, and a mobile terminal comprising a short range communication means capable of performing a short range communication with each of the plurality of image forming apparatus, and capable of connecting via a network to a management system and to a charging system, wherein the method for controlling comprises a step of, in the management system, authenticating that a user of the mobile terminal is a registered user of the printing system, a step of, in the charging system, confirming that clearance processing of the user of the mobile terminal is possible, a step of, in the mobile terminal, instructing to the management system, a print setting of print data that is a printing target, and a search condition for image forming apparatus candidates for executing printing, a search step of, in the management system, searching for one or more image forming apparatuses from out of the plurality of image forming apparatuses in accordance with the instructed search condition, a display step of, in the mobile terminal, displaying display content that associates information of the one or more image forming apparatuses with charge information for when the print data is printed, by the print setting input in the setting region, on the one or more image forming apparatuses, respectively, on a screen that is a screen that includes a selection region by which it is possible to select a printing target from out of the one or more image forming apparatuses searched for in the search step, a step of, in the mobile terminal, transmitting to the management system a print instruction that includes information of an image forming apparatus selected as the printing target in the selection region, a step of, in the management system, issuing to the mobile terminal a print job including authentication information of the image forming apparatus selected as the printing target corresponding to the print instruction if the clearance processing for the user is possible, an outputting step of, in the image forming apparatus selected as the printing target, outputting printed material by printing by the print setting the print data received from the mobile terminal under a condition that an authentication is performed based on the authentication information of the print job received by the short range communication with the mobile terminal via the respective short range communication means, a step of, in the mobile terminal, communicating a completion notification for the outputting in the outputting step to the management system, and a requesting step of, in the management system, making a request for clearance processing based on the charge information to the charging system in accordance with the communicated completion notification.

According to still another aspect, the present invention provides a method of controlling a printing system in which a mobile terminal and a plurality of image forming apparatuses are connectable to a management system and a charging system via a network, wherein the management system comprises authentication means for authenticating that a user of the mobile terminal is a registered user of the printing system, search means for searching for one or more image forming apparatuses from out of the plurality of image forming apparatuses in accordance with a search condition instructed by the mobile terminal, issuance means for issuing a print job including information by which a print instruction to an image forming apparatus which is selected as a printing target can be identified, and requesting means for making a request for clearance processing based on charge information to the charging system after outputting of a printed material by the selected image forming apparatus, and the charging system comprises confirmation means for confirming the clearance processing for a user of the mobile terminal is possible, and execution means for executing the clearance processing in accordance with the request from the management system, and the mobile terminal comprises instruction means for instructing, to the management system, a print setting for print data that is a printing target, and a search condition for image forming apparatus candidates for executing printing, display means for displaying display content that associates information of the one or more image forming apparatuses searched for by the search means of the management system with charge information for when the print data is printed by the print setting on the one or more image forming apparatuses, respectively, on a screen that is a screen that includes a selection region by which it is possible to select a printing target from out of the one or more image forming apparatuses, and transmission means for transmitting, to the management system, a print instruction that includes information of an image forming apparatus selected as the printing target in the selection region, and the image forming apparatus comprises outputting means for outputting printed material by printing by the print setting the print data based on the issued print job when the image forming apparatus is selected as the target of the printing.

By virtue of the present invention, a service provider having an image forming apparatus can easily introduce a print service because the service provider can provide print services by registering necessary information to a management system in advance. Also, because a user of a mobile terminal can select an image forming apparatus that matches conditions from out of a plurality of image forming apparatuses, it is possible to improve the convenience of the user using the service.

Further features of the present invention will become apparent from the following description of exemplary embodiments with reference to the attached drawings.

BRIEF DESCRIPTION OF DRAWINGS

FIGS. 2A, 2B, and 2C are views for showing examples of hardware configurations of apparatuses according to the first embodiment.

FIGS. 5AA, 5AB, 5AC, 5AD, 5AE, and 5AF are views for illustrating example configurations of various information according to the first embodiment.

FIGS. 5BA and 5BB are views for illustrating example configurations of various information according to the first embodiment.

FIG. 5C is a view for illustrating an example configuration of various information according to the first embodiment.

FIGS. 6A and 6B are flowcharts for processing for registration of user information and device information according to the first embodiment.

FIGS. 7A and 7B are flowcharts for processing of a mobile terminal upon a print service usage according to the first embodiment.

FIGS. 8CA and 8CB are views for illustrating example configurations of user interface (UI) screens displayed on a mobile terminal according to the first embodiment.

FIG. 9 is a flowchart for fee calculation processing according to the first embodiment.

FIG. 10 is a view for showing an example of an overall configuration of the system according to a second embodiment.

FIG. 11 is a view for showing an example of a hardware configuration of an image forming apparatus according to the second embodiment.

FIGS. 13A and 13B are views for illustrating a relationship between processing steps and the performance of the steps according to the present invention.

DESCRIPTION OF EMBODIMENTS

Explanation is given for embodiments according to the present invention using the drawings. Note that embodiments shown and described below are examples and the present invention is not limited to these embodiments.

Overview of Printing System Provided in Present Invention

First, an explanation will be given for an overview of a printing system provided in the present invention using FIG. 12A and FIG. 12B.

The printing system provided by the present invention provides a management system (a platform) that allows a business owner of a generic retail shop or a restaurant to become a service provider of a print service and to start a printing business easily. By the print service, the business owner can increase revenue by itself and can make effective use of the service as a tool for getting customers for their main business as a restaurant. Also, the management system provides an arrangement for allowing a general user to be able to use a print service that exists nearby a current location using a mobile terminal, such as a smart phone, easily.

Figure 12A:
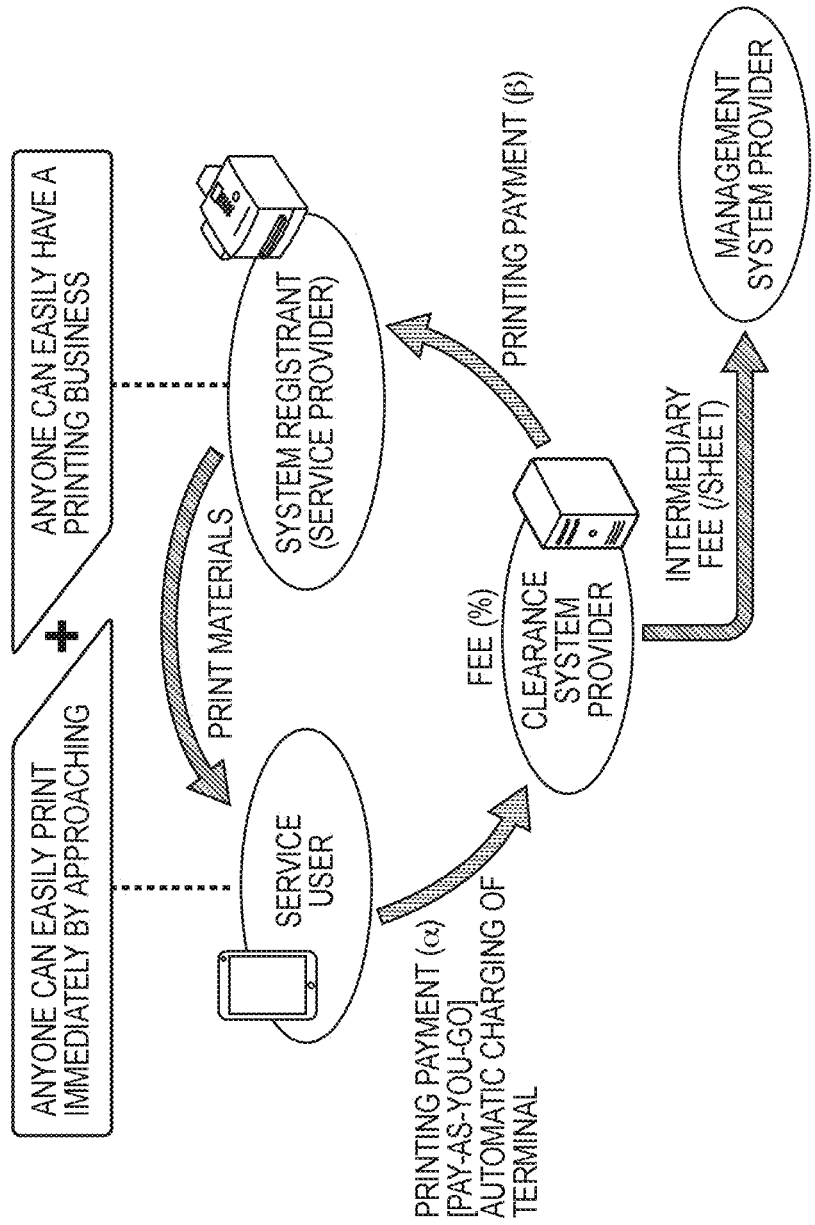
FIGS. 12A and 12B are views for explaining an overview of the printing system according to the present invention.

FIG. 12A shows an example of a business model centering on the printing system provided by the present invention. First, a business owner that is a service provider of a print service registers a purchased image forming apparatus and personal information to a management system. The service provider that has become a system registrant also registers the information corresponding to printing cost to the management system.

At this time, a service provider of management system sells an image forming apparatus main body or a consumable part corresponding to printing system, for example, and a business owner of a retail shop or a restaurant proceeds from facility investment to service initiation easily and quickly. Also, details will be explained later, but if an adapter that can allow an existing image forming apparatus to communicate with a mobile terminal, or the like, is prepared by the business owner of the retail shop or restaurant, it is possible to register to the management system and to start a business.

On the other hand, a service user side installs an application dedicated to the printing system in a mobile terminal. The application performs a registration of user information of the service user, a clearance approach, or the like, by cooperating with the management system. Also, the application obtains information, such as locations of print services already registered in the system, and printing costs from the management system and presents these to the service user. For example, the service user can use a print service existing near their current location easily by using the application.

Each time that the service user (a user) uses the print service and obtains a printed material, a printing payment (a) shown in FIG. 12A is processed as charging processing automatically in accordance with a clearance approach registered in advance. The management system realizes the above described charging processing using a particular clearance system. An existing clearance system performing credit processing provided by a credit company charges predetermined fees upon performing charging processing. Also, the management system takes an intermediary fee relating to performance of various assistance services for linking service providers and service users. Accordingly, a printing payment (B) calculated by subtracting a clearance system fee and an intermediary fee of the management system from the printing payment (a) illustrated in FIG. 12A is deposited as a sale for the service provider from the clearance system.

Figure 12B:
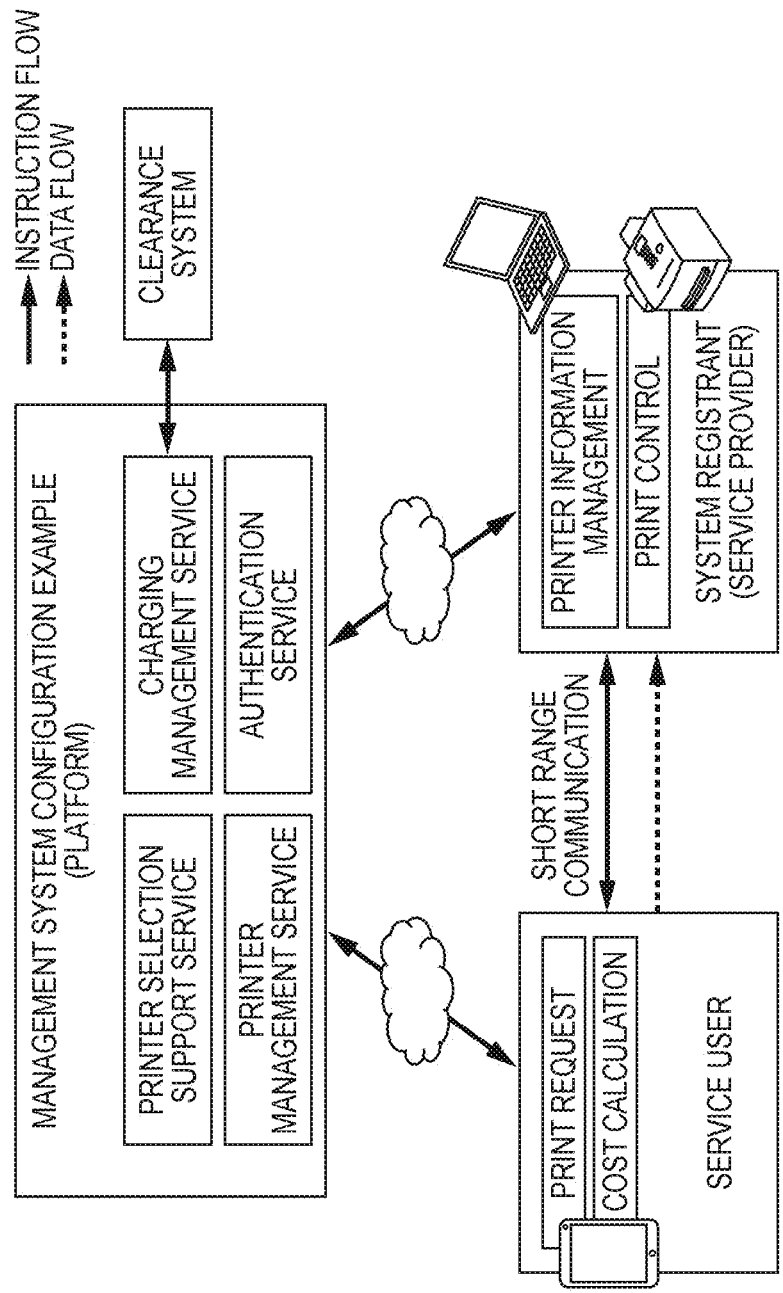

Next, an explanation of an overview of various services for configuring the present invention is given using FIG. 12B.

The printing system, functioning as (a platform of) the management system, provides a print management service for a business to become a service provider easily, and a printer selection assistance service for mediating print services to service users. Also, the management system provides a charge management service for cooperating with a particular clearance system. Also, the management system provides an authentication service for authenticating a service user, a mobile terminal of the service user, a service provider, an image forming apparatus of the service provider, or the like.

A dedicated application of the printing system installed in a mobile terminal of a service user comprises a print request module for using a printer selection assistance service of the management system. Also, the dedicated application for the printing system comprises an image size calculation module for a cost calculation upon selecting a print destination.

A service provider is capable of accessing the management system using a Web browser in a personal computer (PC) or a tablet, and registering, editing, or managing information of an image forming apparatus. Also, the image forming apparatus comprises a print control module for executing printing processing in accordance with a request from a mobile terminal of a service user. Desired short range communication or a wireless communication can be used for a communication between the image forming apparatus and the mobile terminal.

As illustrated in FIGS. 12A and 12B, the service provider can initiate and provide print services easily using a general-purpose application and an image forming apparatus. Accordingly, a new space for installation in an existing store, such as a retail shop or a restaurant, is not required. For example, a printer that is portable (using an automobile) can be installed at an event site upon various events (a wedding ceremony, a graduation ceremony) and print services according to the present application invention can be provided to an event participant. A service user who is an event participant is able to print an image captured by a mobile terminal or a digital camera at the event site easily at the event or when returning from the event. Therefore, the user is able to perform printing easily and immediately, and, furthermore, the effort for mailing a printed material at a later date can be eliminated.

Also, a printer possessed (used) for a business or private use by a service provider can be used for the print service. More specifically, in a case of business or private use, normal printing can be performed by executing printing without passing through the printing system. On the other hand, a user of the service performs printing from the application of the printing system and a clearance is performed appropriately.

Above, an overview according to the printing system provided by the present invention is explained. Below, an arrangement for configuring the printing system, or the like, is explained in detail.

First Embodiment

System Configuration

Figure 1:
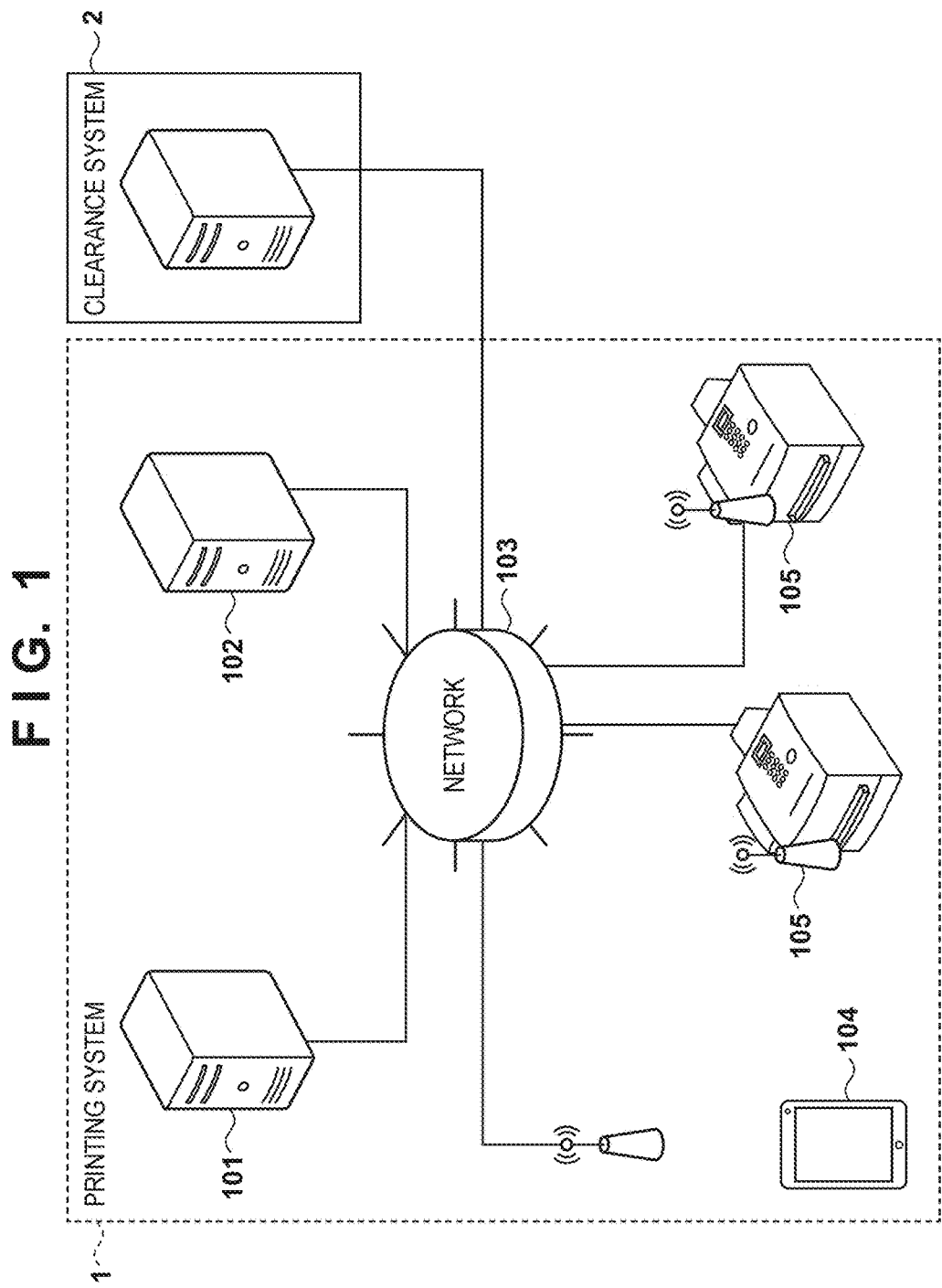
FIG. 1 is a view for showing an example of an overall configuration of a system according to a first embodiment.

FIG. 1 is a view for showing an example of an overall configuration of a print system according to the present embodiment. In the present embodiment, a management server 101, a charging server 102, a mobile terminal 104, and a plurality of image forming apparatus 105 are comprised in a printing system 1 and are able to connect through a network 103. Note that two image forming apparatuses are shown in FIG. 1, but it is assumed that more image forming apparatuses are included. Note that explanation is given in the present embodiment using an example in which the image forming apparatuses are assumed to be multi-function printers (MFPs), but limitation is not made to this example, and single function network printers can be used. Also, image forming apparatus of any scheme, such as an electrophotographic image forming apparatus, or an ink-jet printer may be used if the present invention can be applied. The Internet is, for example, applied to the network 103. Also, the printing system 1 may have a clearance function, but an existing clearance system 2 is used in the present embodiment. Accordingly, it is assumed that the printing system 1 in the present embodiment is connected to the clearance system 2 through the network 103.

The management server 101, functioning as a management system, is a server for concentratedly managing processing and information of the print service according to the present embodiment, such as information of a print job or user information, in the printing system 1. The charging server 102, functioning as a charging system, is a server performing a fee invoice, or the like, generated by execution of a print job in the printing system 1. Note that each of the management server 101 and the charging server 102 is shown as a single computer in FIG. 1, but a configuration may be taken such that processing is distributed and performed by physically dividing these into a plurality of machines. Also, various processing functions of the printing system are performed by dividing the processing between the management server 101, the charging server 102, the mobile terminal 104, and the image forming apparatus 105 in the present embodiment, but this may be integrated in a cloud system appropriately, or may be distributed within a cloud system as appropriate.

The mobile terminal 104 performs communication with the management server 101 or the image forming apparatus 105 through the network 103. Furthermore, the mobile terminal 104 is capable of performing direct communication with the image forming apparatus 105 using a well-known wireless communication technique, such as Near Field Communication (NFC) in the present embodiment.

The image forming apparatus 105 performs communication with the management server 101 or the mobile terminal 104 through the network 103. Furthermore, the image forming apparatus 105 is capable of performing direct communication with the mobile terminal 104 using a known wireless communication technique, such as NFC, in the present embodiment. Also, the image forming apparatus 105 performs printing processing based on a print job received from the management server 101 and outputs a printed material. An embodiment of the printing processing itself of the image forming apparatus 105 may, however, be such that it is performed based on a job execution instruction from the mobile terminal 104, and such that it uses the management server 101 for communicating information required for another system. Note that the image forming apparatus 105 may be installed so as to be dedicated to the printing system. Furthermore, by connecting locally to an information processing apparatus, such as a PC, a configuration may be taken such that the service provider itself can be used as an output terminal.

Known charging processing according to a request from another system can be used for the clearance system 2 and a detailed explanation will be omitted. It can be considered that, as described above using FIGS. 12A and 12B, an existing clearance system provided by a credit company, or the like, for example, can be used for the clearance system 2.

Hardware Configuration

Figure 2C:
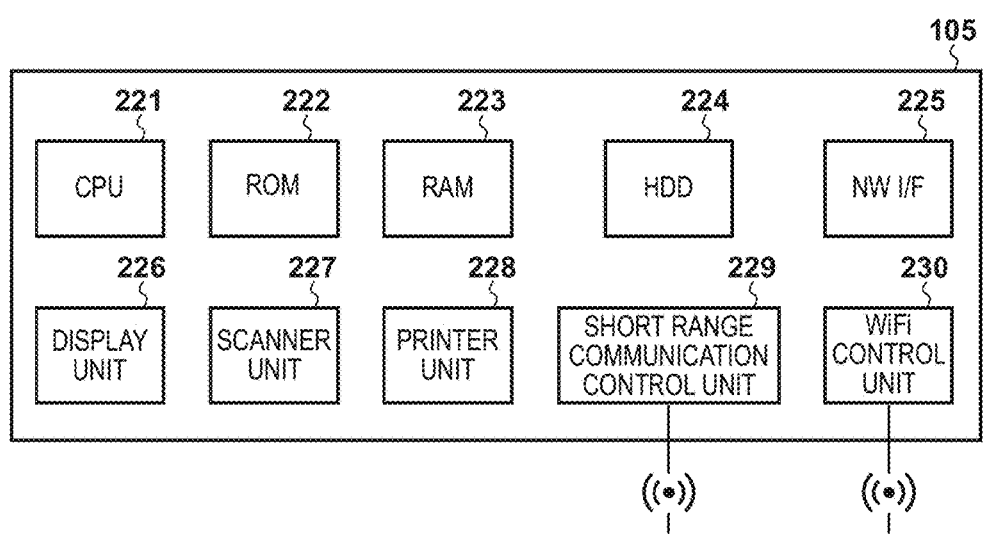

FIGS. 2A, 2B, and 2C are views for showing examples of hardware configurations of various apparatuses according to the present embodiment.

FIG. 2A shows an example of a hardware configuration of the management server 101 and the charging server 102. Note that an explanation is given for a case in which the management server 101 and the charging server 102 are the information processing apparatuses and the configuration is same at that of a general-purpose information processing apparatus. A central processing unit (CPU) 201 controls the information processing apparatus on the whole. For example, processing according to the present invention is realized by the CPU 201 reading and executing various programs stored in a read only memory (ROM) 202, a hard disk drive (HDD) 204, or the like.

The ROM 202 is a nonvolatile storage unit and stores various programs. A random access memory (RAM) 203 is a volatile storage unit and, for example, is used as a work memory for processing of the CPU 201. The HDD 204 is a nonvolatile storage unit and stores various programs and holds the results of processing. A network interface (I/F) 205 performs communication with an external apparatus through the network 103, or the like. A display unit 206 functions as a user interface and displays various information to a user. A user interface (UI) 207 is a user interface, such as a mouse or a keyboard, for receiving operations from a user. Also, each configuration element in the information processing apparatus is connected with each other communicatively by a bus 208.

FIG. 2B shows an example of a hardware configuration of the mobile terminal 104. Note that the mobile terminal 104 is described assuming the example of a smart phone in the present embodiment, but the mobile terminal 104 is not limited to a smart phone and a device that a user can carry, such as a mobile PC, a tablet terminal, a digital camera, or the like, may be used. A CPU 211 controls the mobile terminal 104 on the whole. For example, processing according to the present invention is realized by the CPU 211 reading and executing various programs stored in a ROM 212, a RAM 213, or the like.

The ROM 212 is a nonvolatile storage unit and stores various programs. The RAM 213 is a volatile storage unit and, for example, is used as a work memory for processing of the CPU 211. A secure digital (SD) device 214 is a nonvolatile storage unit, such as a flash memory (for example, an SD card), and stores various programs and holds the results of processing. A Global Positioning System (GPS) 215 is a system for finding out one's own location information using satellites. It is assumed that a known technique is used for a function in the GPS 215 and a detailed explanation will be omitted. A display unit 216 functions as a user interface and displays various information to a user. Also, the display unit 216 also functions as an interface, such as a touch panel, and receives operations from the user. A camera 217 is an image capturing apparatus and performs imaging based on an instruction of the user, or the like.

A short range communication control unit 218 is used when the mobile terminal 104 performs short range communication with various external devices directly without passing through the network 103. In the present embodiment, an explanation is given for an example in which the mobile terminal 104 and the image forming apparatus 105 can perform the short range communication. Note that a specification of the short range communication is not limited particularly, and any specification or scheme may be used if the present invention can be adopted, but short-range wireless communication using radio is advantageous. A WiFi control unit 219 is used for controlling communication by Wireless Fidelity (Wi-Fi®), which is a wireless local area network (LAN) specifications. The WiFi control unit 219 can use a predetermined Wi-Fi® hotspot (a public wireless communication network). A mobile communication control module 220 is used for controlling communication using a communication service provided by a particular communication carrier. The mobile communication control module 220 connects to a telephone public circuit network, such as the network 103, through the above described communication service. Also, the CPU 211 in the mobile terminal 104 is connected to each configuration element so as to be able to control them.

FIG. 2C is a view for showing an example of a hardware configuration of the image forming apparatus 105. A CPU 221 controls the image forming apparatus 105 on the whole. For example, processing according to the present invention is realized by the CPU 221 reading and executing various programs stored in a ROM 222, a RAM 223, or the like.

The ROM 222 is a nonvolatile storage unit and stores various programs. The RAM 223 is a volatile storage unit and, for example, is used as a work memory for processing of the CPU 221. A HDD 224 is a nonvolatile storage unit and stores various programs and holds the results of processing. A network I/F 225 performs communication with an external apparatus through the network 103, or the like (mainly by a wired connection). A display unit 226 functions as a user interface and displays various information to a user. Also, the display unit 226 functions as an interface, such as a touch panel, and receives operations from the user. A scanner unit 227 is a reading apparatus, and performs reading of an original, or the like, based on a user instruction, or the like. A printer unit 228 is a printing apparatus and, based on a print job, performs printing of an image and performs output of a printed material. A short range communication control unit 229 is used when the image forming apparatus 105 performs direct communication with various external devices without passing through the network 103. In the present embodiment, the image forming apparatus 105 can perform short range communication with the mobile terminal 104 directly. A WiFi control unit 230 is a configuration for controlling communication by Wi-Fi®. Also, the CPU 221 in the image forming apparatus 105 is connected to each configuration element so as to be able to control them.

Note that each unit shown, and described above, is a part required for performing processing according to the present embodiment, although other configuration elements may also be included.

Software Configuration

Figure 3A:
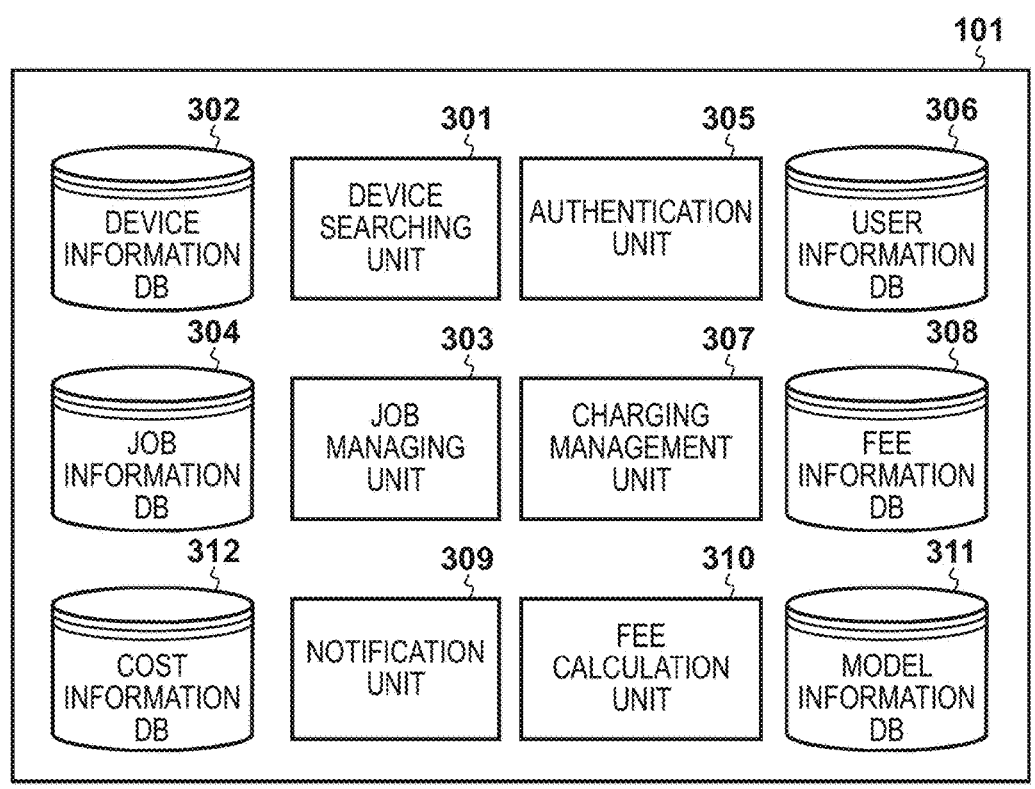
FIGS. 3A, 3B, and 3C are views for showing examples of software configurations of apparatuses according to the first embodiment.
Figure 3B:
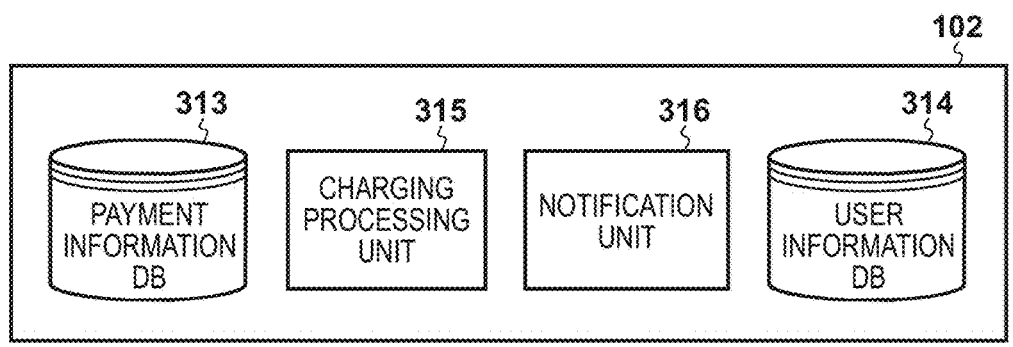
Figure 3C:
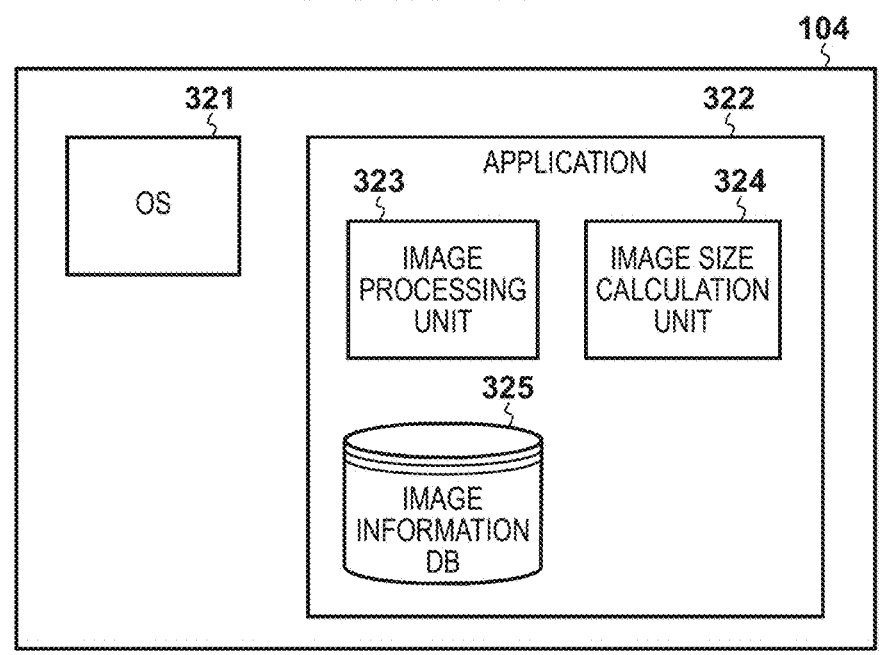

FIGS. 3A, 3B, and 3C are views for showing examples of a software configuration of various apparatuses according to the present embodiment. Note that a configuration may be taken such that each information item shown, and described below, may be held physically as a different table in a storage unit, or may be distributed into a plurality of tables and managed. Also, data on a server may be managed on an external apparatus. Note that details of information held in various databases (DBs) in each apparatus will be explained later using FIG. 5AA to FIG. 5C.

FIG. 3A is a view for showing an example of a software configuration of the management server 101. The management server 101 is comprised of a device searching unit 301, a device information DB (database) 302, a job managing unit 303, and a job information DB 304. Furthermore, the management server 101 is comprised of an authentication unit 305, a user information DB 306, a charging management unit 307, a fee information DB 308, a notification unit 309, a fee calculation unit 310, a model information DB 311, and a cost information DB 312.

The device searching unit 301 searches an image forming apparatus on which print processing is possible based on information (device information) obtained from the image forming apparatus 105, as well as location information and a print request from the mobile terminal 104. The fee calculation unit 310 performs calculation of a printing fee (a payment fee) to be transmitted to the charging server 102 based on information of the device information DB 302 and image size (details to be explained later) information, as well as print request information from the mobile terminal 104. The job managing unit 303 generates a print job according to a request from the mobile terminal 104, manages the print job, and transmits the print job to a designated image forming apparatus. The authentication unit 305 performs authentication of a user who performed a print request based on registered information and information from the mobile terminal 104. In other words, the authentication unit 305 authenticates whether or not a user who performed a print request is a registered user. The charging management unit 307 performs a query as to whether or not payment of a fee, which is generated along with print processing, which is executed based on a print request from the mobile terminal 104, and a request for payment to the charging server 102. The notification unit 309 communicates to various destination addresses, such as those of a user and a service provider, that a fee based on a print request is charged normally and paid.

FIG. 3B is a view for showing an example of a software configuration of the charging server 102. The charging server 102 is comprised of a payment information DB 313, a user information DB 314, a charging processing unit 315, and a notification unit 316. The charging processing unit 315, according to a request from the management server 101, performs charging processing comprehensively for a user who performed a print request by referring to the payment information DB 313 and the user information DB 314. The notification unit 316 performs transmitting/receiving of data and processing results with the management server 101.

FIG. 3C is a view for showing an example of a software configuration of the mobile terminal 104. The mobile terminal 104 is comprised of an operating system (OS) 321, an application 322, and an image information DB 325. The OS 321 comprehensively executes basic processing inside of the mobile terminal 104. The OS 321 may be an iOS® of Apple®, or Android® of Google®. The application 322 operates under the control of the OS 321. For the present embodiment, the application 322 is comprised of an image processing unit 323 and an image size calculation unit 324. The image size calculation unit 324 calculates image size based on print data (file) in order to calculate a cost (fee), which is generated when a user prints a designated image. The image size here indicates a total number of pixels (dots) that are formed on a sheet when printing an image on an image forming apparatus. In a case when print data is text, however, it is acceptable to calculate an approximate calculation value by setting a printing ratio (print duty) at a value of, for example, 5%, and a publicly known technique of calculation is applicable. For precise calculation, it is preferred that a cost (fee) be calculated accurately, but an approximate calculation value may be used for the toner and the amount of ink (weight) used when printing. This is because configuring a pay-as-you-go system of costs rather than a uniform charge irrespective of the print content has merits for both the user, in that it results in appropriate charges, and the service provider in that it results in appropriate prices. The image processing unit 323 processes images captured by the camera 217 and also images managed on the OS 321 based on instructions of a user.

In order to use the print service, it is necessary to perform, in advance, a required initial setting, such as downloading and installing to the mobile terminal 104 an application program of the print service, and giving consent to usage conditions of the application. Information that is initialized is, for example, communicated to the charging server 102 and the management server 101 through the network 103, and is stored in a user information DBs 306 and 314. In the present embodiment, an example is shown in which the application 322 is implemented as an application that can be freely installed/uninstalled on the mobile terminal 104.

Also, in order to provide this print service, there is a need for an owner of the image forming apparatus 105 (service provider), to perform, in advance, required initialization using a PC or another information processing apparatus connected to the image forming apparatus 105. The initialized information is, for example, communicated to the management server 101 through the network 103, and is stored to the device information DB 302 and the fee information DB 308.

Note that each processing unit shown, and described above, is a part required for performing processing according to the present embodiment, although other configuration elements may also be included. Also, in the present embodiment, an explanation will be given of printing target data as image data. The invention is not limited, however, to this embodiment, and, in addition to files, such as a photo image or a text file, data and files that can be output on an image forming apparatus, such as a printer, are included in the meaning of printing target data.

Processing Sequence

Figure 4A:
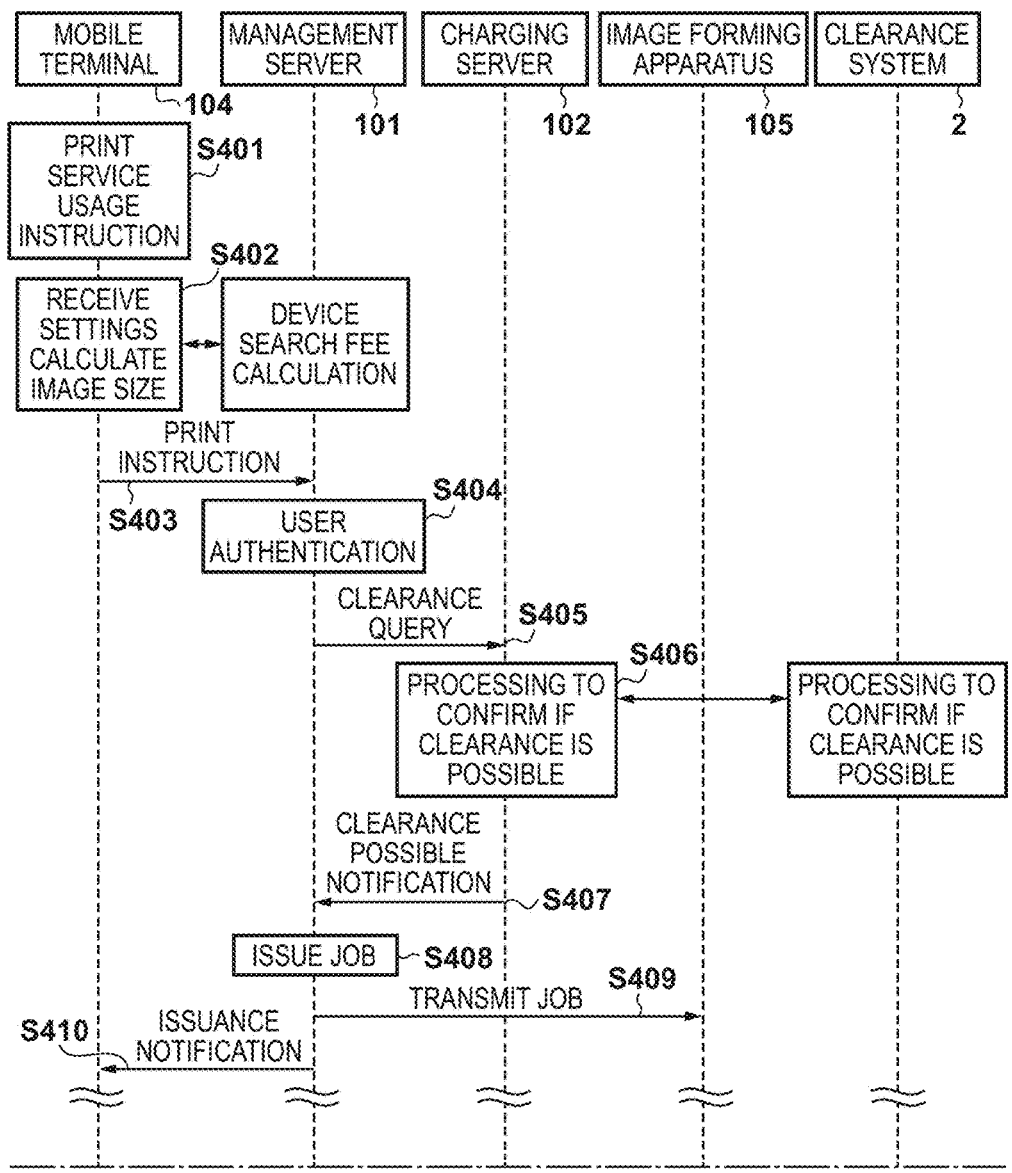
FIGS. 4A and 4B are views for showing a processing sequence between apparatuses according to the first embodiment.
Figure 4B:
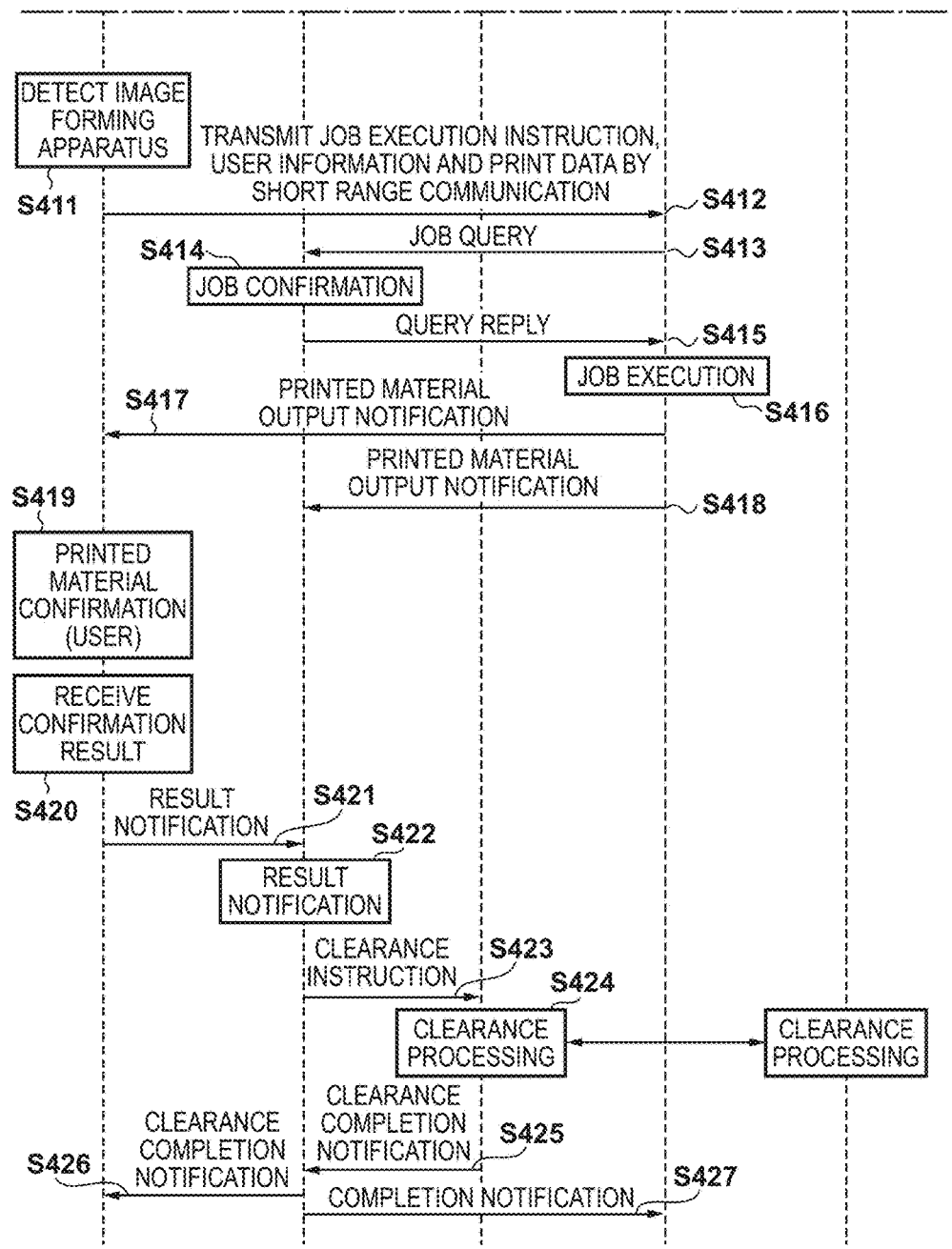

FIGS. 4A and 4B are views showing an overall outline of a processing sequence between various apparatuses when using a print service according to the present embodiment. Each process, for example, is realized by a CPU, as a part of the performer of the processing, reading and executing a program stored in a storage unit.

In step S401, the mobile terminal 104 receives an instruction from a user indicating that the print service is used.

In step S402, the mobile terminal 104 receives, from a user, user information, various print setting information (printing target print data (a file), double-sided or single-sided, paper type, or the like) according to a printing process, and information of a location at which performance of the printing is desired. Next, the mobile terminal 104 performs a calculation of an image size in order to perform calculation of a generated cost (a printing fee) for the print processing, based on the received information. In this step, the mobile terminal 104 performs collaboration with the management server 101, and, together, they obtain a result of a fee calculation by a search, performed on the management server 101 side, for an image forming apparatus that can support the print settings, as well as a calculation of a coloring material fee based on the image size. Searching for an image forming apparatus that can support the print settings is not limited to one that considers which sheet sizes and paper types can be printed. A determination may be made also considering the existence or absence of sheets or coloring materials (toner or ink). Details of this process will be explained later.

In step S403, the mobile terminal 104 transmits identifying information, such as information of an image forming apparatus for performing the printing, a name of the printing target print data (a file), and a print instruction that includes user information, to the management server 101.

In step S404 the management server 101 performs authentication processing based on user information included in the print instruction transmitted from the mobile terminal 104. The authentication processing here is performed by comparing received user information (for example, a user identifier) and user information managed on the user information DB 306. Note that the authentication processing is not limited to being performed at this step, for example, and it may be performed between step S401 and step S402.

In step S405, the management server 101 queries the charging server 102 as to whether or not clearance processing is possible for a user who has succeeded at authentication. At this time, the management server 101 also transmits user information.

In step S406, the charging server 102 determines whether or not clearance processing is possible based on the information received from the management server 101. Here, the confirmation processing is performed by comparing information received from the management server 101 with information registered to the user information DB 314. For example, in a case when credit information of the user for which the query is received is registered to the user information DB 314, the charging server 102 determines that payment is possible. In the present embodiment, the charging server 102 does not have a clearance function, and so, when determining whether or not clearance is actually possible based on registered credit information, a query is performed to the clearance system 2. Then, based on the response from the clearance system 2, it is determined whether or not clearance is possible.

In step S407, the charging server 102 communicates to the management server 101 a confirmation result as to whether or not clearance processing is possible for the user for which the query was received.

In step S408, the management server 101 generates a print job based on identifying information and print settings, such as the name of print data (file) included in the print instruction received from the mobile terminal 104 in step S403, and registers the print job to the job information DB 304.

In step S409, the management server 101 transmits the issued print job to the image forming apparatus 105 designated in the print instruction. At this time, the image forming apparatus 105 defers executing the print job until it receives an execution instruction for the print job from the mobile terminal 104. The print job transmitted to the image forming apparatus 105 includes information of a number of sheets to be printed. For this reason, it is possible for the administrator (service provider) of the image forming apparatus 105 to supply, in advance, consumable parts, such as sheets or coloring material to the image forming apparatus 105 if it is determined that the remaining capacity of sheets or coloring material is less than is indicated in this information.

In step S410, the management server 101 communicates to the mobile terminal 104 a print job issuance notification that includes job information of the print job. In the present embodiment, in order to provide a guarantee of reception and a guarantee of printing for a printed material, charging processing and clearance processing is performed after the user confirms the printed material and confirms that normal printed material is output, which can reduce an effort associated with refund processing and cancellation processing. It is also possible, however, to immediately print a printed material, and to perform charging processing and clearance processing after issuance of a print job. Also, a plurality of a sheet discharge trays of the image forming apparatus 105 are built into the main body, and these are of an inner buffer type that are individually released upon user authentication, even if a printed material is printed immediately after the issuance of the print job, it is possible to provide a guarantee of reception of the printed material.

In step S411, the mobile terminal 104 is moved to the location of the image forming apparatus 105 designated by the user, and stands by until it is detected that short range communication can be initiated with the image forming apparatus 105.

In step S412, the mobile terminal 104, when short range communication with the image forming apparatus 105 becomes possible, initiates the short range communication. Then, the mobile terminal 104, using this communication, transmits user information of the mobile terminal 104, print data, and the job information received in step S410. At this time, an execution instruction for the print job issued in step S409, which the image forming apparatus 105 holds, is performed.

Note that by configuring such that the mobile terminal 104 and the image forming apparatus 105 have a high speed wireless LAN function, it is possible that only authentication needed for the wireless LAN communication and communication parameter settings are performed using the short range communication, and a handover is used to perform other communication on the wireless LAN. Therefore, in addition to making it possible to reduce a communication time in a case when the size of the print data is large, it is also possible to relax a distance restriction of the short range communication. An arrangement can also be provided for directly sending print data (a file) that is saved to a cloud or a server, to an image forming apparatus that performs printing, rather than print data (a file) that is saved in the mobile terminal 104.

In step S413, the image forming apparatus 105 makes a query for the job to the management server 101 based on the user information and the job information, in response to the image forming apparatus 105 receiving the execution instruction for the print job from the mobile terminal 104.

In step S414, the management server 101 verifies the job information of the job information DB 304 that is issued/is already registered in step S408 against the received job information.

In step S415, the management server 101 transmits a confirmation result of step S414 to the image forming apparatus 105. At this time the management server 101, after confirming the result, transmits to the image forming apparatus 105 a response indicating that a predetermined print job will be a target if there is no problem with the job information.

In step S416, the image forming apparatus 105 executes the print job received from the management server 101 in step S409. With this, printed material is output from the image forming apparatus 105. Additionally, a trigger for executing a print job does not need to be short range communication between the mobile terminal 104 and the image forming apparatus 105. For example, a configuration may be taken in which the image forming apparatus 105 is specified (for example, by capturing a Quick Response Code (QR Code®) using a camera) using input means that is installed in the mobile terminal 104, and a configuration may be taken in which a user ID is input using input means of the image forming apparatus 105. In other words, so long as the configuration is such that pairing of the service user and the image forming apparatus 105 is possible, there is no particular limitation.

In step S417, the image forming apparatus 105 makes a notification to the mobile terminal 104 indicating that printed material is output. The notification of the mobile terminal 104 can be performed directly using short range communication between the short range communication control units 218 and 229 or wireless LAN communication.

A configuration may also be taken, however, such that notification is performed through the management server 101.

In step S418, the image forming apparatus 105 makes a completion notification to the management server 101 indicating that the printed material is output. Here, the completion notification is, for example, performed through the network 103.

In step S419, the user performs a confirmation of the printed material output on the image forming apparatus 105. At this time, the mobile terminal 104, after transmitting an execution instruction of a print job to the image forming apparatus 105, displays a screen for inputting whether or not a printed material is output normally and stands by.

In step S420, the mobile terminal 104 receives from the user an input of a result as to whether or not the printed material is output normally. It is possible to also say that this input is an instruction of an authorization of a clearance or of a non-authorization by a user.

In step S421, the mobile terminal 104 transmits an output material confirmation result (confirmation notification) that is input by the user to the management server 101. At this time, the executed print job is uniquely identified, and a job identifier that can be identified is also transmitted.

In step S422, the management server 101 performs a confirmation or determination of whether or not the print job executed normally. This process is performed, after the reception of the output completion notification that is received from the image forming apparatus 105 in step S418, and the information (confirmation notification) corresponding to the output result that is received from the mobile terminal 104 in step S421, based on this information and job information managed on the job information DB 304.

In step S423, the management server 101, in a case when execution of a print job is performed normally, instructs the charging server 102 to perform clearance of the fee (the fee calculated in step S402) that accompanies the execution the print job. Here, for example, the job identifier and user information is transmitted. Additionally, a configuration may be taken such that, when a notification that an abnormality occurred in the printed material is received, the management server 101 is controlled such that a print job is issued once again, or a notification is made to the administrator (service provider) of the image forming apparatus 105 that output the printed material for which the abnormality occurred. Additionally, when notifying the administrator, for example, it is possible to make the notification using administrator information 505 of device information 500 of FIG. 5AA. For the present embodiment, since the charging process is performed after the user confirms the printed material, charging is not performed for a printed material for which an abnormality occurred, and there is an advantage in that a process for refunding becomes unnecessary.

In step S424, the charging server 102 collaborates with the clearance system 2, and performs clearance processing for the print job that is executed normally, based on the instruction from the management server 101. In the present embodiment, the charging server 102 instructs the clearance system 2, and enters charge information to a debit side of an account of the user. Also, for an operator of the printing system 1, a predetermined infrastructure usage fee (or an intermediary fee for the printing) is entered on a credit side, for the clearance system 2 itself a predetermined fee is entered on a credit side, and the remaining amount is entered as a sale on a credit side of an account of the service provider. The sale for the service provider, as explained later, includes a consumables price, a charge for depreciation, and a fee (profit).

For step S425, after clearance processing is complete, the charging server 102 notifies the management server 101 of something to that effect.

In step S426, the management server 101 notifies the mobile terminal 104 that the clearance processing has completed normally, based on the notification from the charging server 102.

For step S427, the management server 101 makes a notification to a pre-registered address that the printing processing and the clearance processing is complete. In the example in FIGS. 4A and 4B, the notification is made to an address of the image forming apparatus 105.

As described above, a sequence for the print service according to the present embodiment is performed. Additionally, the order of the flow does not need to be fixed to that which is shown above, and a configuration may be taken such that the required exchange of information is performed.

Data Configuration

Below, an explanation will be given for an example of data configurations that are managed on each apparatus according to the present embodiment. Additionally, the configuration shown below is only one example, and other information may be included, or a different configuration may be taken.

Management Server

FIG. 5AA to FIG. 5AF show example configurations of data that is managed on the device information DB 302, the job information DB 304, the user information DB 306, the fee information DB 308, the model information DB 311, and the cost information DB 312 of the management server 101.

In FIG. 5AA, the device information 500 includes a device identifier 501, a device name 502, a model name 503, location information 504, the administrator information 505, function information 506, a function status 507, and cost information 508. Each record of the device information 500 is generated when a service provider registers the image forming apparatus 105 to the printing system. The device identifier 501 is identification information for uniquely identifying the image forming apparatus 105 on the printing system. The device name 502 is a name of a device that is registered by an owner (service provider) of the image forming apparatus 105. The model name 503 is a model number or model information that is allocated by a maker of the image forming apparatus 105. Through this information, for example, a configuration may also be taken so as to specify functions comprised by the image forming apparatus 105.

Location information 504 is information that shows a position of the image forming apparatus 105. A configuration may be taken such that the location information 504 is registered as a fixed value (an address, or a coordinate) by an owner, or the location information may be regularly obtained and updated. The administrator information 505 shows information of an owner (administrator) of the image forming apparatus 105. The function information 506 shows functions comprised on the image forming apparatus 105. The function status 507 shows the states of each of the functions comprised on the image forming apparatus 105 or a current state of the image forming apparatus 105. Due to a toner outage or a consumption of a part, there are cases when a usable function is restricted, and the image forming apparatus 105 updates information by regularly obtaining this information from the image forming apparatus 105. The cost information 508 is set as cost information 542, the details of which will be explained later, by default. A service provider may, however, correct/change this cost information.

In FIG. 5AB, job information 510 includes a job identifier 511, a user identifier 512, a device identifier 513, an image identifier 514, a status 515, an issuance date 516, and a completion date 517, and a record is generated each time a print request is made. Each record of the job information 510 may be deleted at the point in time when charging and printing of a job is completed, or may be deleted after being held for a predetermined period (for example, 1 month). The job identifier 511 is identification information for uniquely identifying a print job in the printing system. The user identifier 512 is identification information of a user who performed the print instruction according to the print job. The device identifier 513 is identification information of an image forming apparatus that is designated by a user as the image forming apparatus that executes the print job. The image identifier 514 is information for identifying data (file) that is a printing target designated by a user. The image identifier 514 may be substituted with a data (file) name of data managed on a mobile terminal. Also, in a case when a user simultaneously designates a plurality of data items as printing targets, as shown in a record of a job identifier (JI0001) in FIG. 5AB, a plurality of image identifiers are managed for a single job identifier. Also, as illustrated in the example in FIG. 5AB, data that is a printing target shown in two records with the job identifiers "JI0001" and "JI0003" illustrates a job requested from different users using the same mobile terminal.

The status 515 is information showing a current state of the print job. For example, the status may be "not yet executed", "in print processing", "executed (awaiting payment)", or "payment completed". The issuance date 516 shows a date/time at which the print job was issued by the management server 101. The completion date 517 shows a date/time at which printing processing and clearance processing was completed for the print job.

In FIG. 5AC, user information 520 includes a user identifier 521, a user name 522, a password 523, a mobile terminal identifier 524, mobile terminal location information 525, credit information 526, and notification destination information 527. Each record of the user information 520 is generated when a user registers to use the printing system. For the printing system, the user identifier 521 is identification information for uniquely identifying a user who registered as a service user of the print service. The job information 510 corresponds to the user identifier 512. The user name 522 is a name of a user who registered by user registration. The password 523 is a password of a user who registered by user registration. The user name 522 and the password 523 are used in authentication processing.

The mobile terminal identifier 524 is identification information for uniquely identifying the mobile terminal 104 used by a user. Mobile terminal location information 525 is information indicating a current position of the mobile terminal 104, and information such as the GPS 215, or the like, may be used. Credit information 526 is payment information required for performing payment of a fee that is generated when the print service is used. For example, account information of a bank, information of a credit card that is used when withdrawing a fee may be applied as credit information. The notification destination information 527 is information of a notification destination to which to communicate a result of processing and a clearance result of the print service.

For FIG. 5AD, fee information 530 includes a device identifier 531, a function 532, and a fee 533. Each record of the fee information 530 is generated when a service provider registers the image forming apparatus 105 to the printing system. The device identifier 531 corresponds to the device identifier 501 of the device information 500. The function 532 shows functions comprised on the image forming apparatus 105. The fee 533 is information for profits that an administrator (service) of the image forming apparatus 105 obtains when a user of the mobile terminal 104 uses the functions shown in the function 532. A user of the mobile terminal 104 is charged for a cost of a consumable material (a sheet and an ink or a toner), and a charge for depreciation of the image forming apparatus 105 in addition to the fee information 530. Here, the administrator (service provider) of the image forming apparatus 105 is able to set different fees for each function of an image forming apparatus, and for each image forming apparatus.

In FIG. 5AE, model information 540 includes a model name 541 and the cost information 542, and illustrates costs of consumable materials (toner, ink, and a sheet) and a charge for depreciation required for a model of an image forming apparatus to print one sheet for each model name. Details will be explained later. It is assumed, however, that a maker of the image forming apparatus registers costs of official products by default.

For FIG. 5AF, cost information 550 includes a fee item 551, a classification 552, and a unit price/coefficient 553 in correspondence with the cost information 508 of FIG. 5AA. The fee item 551 illustrates a general classification of an item for calculating a fee for print data. A toner consumption amount, a paper type, the existence or absence of double-sided printing, a depreciation cost unit price, a media type coefficient, a media size coefficient, a mode coefficient, and a continuous printing sheet number coefficient are given here as examples.

Here, an overall unit price for an image forming apparatus is shown as the depreciation cost. In more detail, the depreciation cost includes depreciation costs that correspond to parts that comprise in the image forming apparatus 105, such as an engine depreciation cost and a fixing unit depreciation cost, or the like. The engine depreciation cost represents a depreciation cost of an image forming apparatus main body (for example, a paper feed unit) for each sheet, which differs based on whether or not double-sided printing is performed, or the depreciation cost of the image forming apparatus main body due to the number of printed sheets for each job. The fixing unit depreciation cost represents a depreciation cost of the fixing unit for each sheet, which differs according to the paper type, or the depreciation cost of the fixing unit for the number of printed sheets for each job.

Also, while it is not shown, in the present invention, when performing control for cleaning and tint calibration before printing due to an individual request by a user, it is possible to add a corresponding cost as a depreciation cost.

The mode coefficient represents a correction coefficient for depreciation due a different engine part being used when color printing than when monochrome printing. In the same way, the media type coefficient and the media size coefficient represent correction coefficients for depreciation corresponding to the type of sheet and the size of sheet that are used, or the like.

The classification 552 shows a more detailed classification of the fee item 551. For example, for the toner consumption amount, settings corresponding to red green blue (RGB) printing rates for each sheet size for paper types is shown. A unit price/coefficient 553 shows a standard unit price of a fee that is generated for each item or a values of coefficients for fees that correspond to print settings.

Charging Service

FIG. 5BA and FIG. 5BB show example configurations of data managed on the user information DB 314 and the payment information DB 313 in the charging server 102.

In FIG. 5BA, payment information 560 includes a user identifier 561, a job identifier 562, a fee 563, and a payment status 564, and a record is generated each time a print request is made. Each record of the payment information 560 may be deleted at the point in time when charging and printing of a job is completed, or may be deleted after being held for a predetermined period (for example, 1 month). The user identifier 561 indicates a user who performs payment, and corresponds to the user identifier 521 of the user information 520 that is managed on the management server 101. The job identifier 562 shows a payment target print job, and corresponds to the job identifier 511 of the job information 510 that is managed on the management server 101. The fee 563 shows a charge fee accompanying execution of a print job. The payment status 564 shows a state of payment. The value of the payment status 564 may be "not yet complete" or "complete".

In FIG. 5BB, user information 570 includes a user identifier 571, a user name 572, a password 573, and a credit information 574. Each record of the user information 570 is generated when a user registers to use the printing system. These correspond to each of the user identifier 521, the user name 522, the password 523, and the credit information 526 of the user information 520 that is managed on the management server 101.

Mobile Terminal

FIG. 5C shows an example configuration of data managed on the image information DB 325 for the mobile terminal 104.

For FIG. 5C, image information 580 includes an image identifier 581, a data name 582, a file type 583, and a size 584. Each record of the image information 580 is generated when a user selects an image with which to use the printing system. The image identifier 581 is identification information for uniquely identifying image data. This corresponds to the image identifier 514 of the job information 510 that is managed on the management server 101. The data name 582 shows a name of image data. Additionally, a configuration may be taken such that the data name 582 can indicate a path at which the image data is stored. The file type 583 shows a file format (file extension) of image data. The size 584 shows a size of image data.

Registration Processing

Next, an explanation will be given for processing for registering data by each of a service provider and a service user, when using a print service provided by the printing system, which must be performed in advance.

Service User (Service User)

In the present embodiment, the service user performs a registration of the service user's own information (user information) in advance via the mobile terminal 104, or the like. Here, the user registers the user information 520 to the management server 101, and registers the user information 570 to the charging server 102. This registration processing is performed prior to the usage of the print service illustrated in FIGS. 4A and 4B, and thereby necessary information is registered. It is possible to perform maintenance and updating of registration items asynchronously to the procedure of FIGS. 4A and 4B in which the lack of a contradiction in the data is not lost after first registering.

FIG. 6A illustrates a processing flow by which user information is registered to the management server 101. This processing flow is realized by the CPU 211, which the mobile terminal 104 comprises, reading and executing a program stored in the SD 214. Note that the program corresponding to this processing is installed in the mobile terminal 104 as the application 322.

In step S601, the mobile terminal 104 activates the application 322 based on a user instruction.

In step S602, the mobile terminal 104 displays a user information registration screen (not shown) provided by the application 322, and receives the user information from the user. The user information received here corresponds to the user name, the password, the credit information, the notification destination information, or the like, in the user information 520 of FIG. 5AC.

In step S603, the mobile terminal 104 transmits the user information received from the user to the management server 101, and instructs the registration. At this time, the management server 101 transmits the same information to the charging server 102, and performs a synchronization of the user information. This processing flow is then terminated.

Service Provider

FIG. 6B shows a processing flow for when device information is registered. This processing flow is realized by a CPU, which the image forming apparatus 105 or an information processing apparatus (PC) connected to the image forming apparatus 105 comprises, reading and executing a program stored in a storage unit. Here, the processing is performed via a WEB browser (not shown) that the information processing apparatus (not shown) connected to the image forming apparatus 105 comprises.

In step S611, the information processing apparatus, based on an instruction by the service provider, accesses the management server 101, and performs a device registration request.

In step S612, the information processing apparatus, in accordance with the device registration request, displays a device registration screen (not shown) that is provided from the management server 101 to the WEB browser (not shown).

In step S613, the information processing apparatus, via the device registration screen (not shown), receives device information and fee information from the service provider. The device information received here corresponds to the device name, the identification information, the location information, the administrator information, or the like, from out of the device information 500 of FIG. 5AA. Note that the model name may be obtained automatically by the information processing apparatus reading the identification (ID) of the image forming apparatus 105. Also, when the service provider is using an official product as a consumable of the image forming apparatus 105, the cost information 542, which the maker or the service provider of the printing system registered in advance, is used as a default for the cost information 508. When the service provider is not using an official product, the service provider may correct/input the cost information 508 via a registration screen (not shown).

In step S614, the information processing apparatus transmits the device information and the fee information input at the device registration screen (not shown) to the management server 101, and instructs registration. This processing flow is then terminated.

Fee Calculation Processing

Continuing on, processing for fee calculation accompanying the usage of the print service according to the present embodiment will be explained. Here, the calculation of printing fees is performed based on the cost of consumables (toner, ink, sheets) being consumed by the printing, a depreciation cost for the image forming apparatus incurred due to the printing, and a profit of the service provider (a print service fee). For example, the elements below are used to calculate the fee. Note that the elements shown here are only one example, and the invention is not limited to these: the number of print copies, the sheet type, the sheet size, the print settings (double-sided/single-sided, etc.), the device information, the type of image data, the image size, the number of pages printed for each job, and the profit rate on the service provider side (for the calculation of the print service fee)

In the present embodiment, using the above-described elements, the fee calculation is performed in two stages: the application 322 of the mobile terminal 104 (the image size calculation unit 324), and the fee calculation unit 310 of the management server 101 (the detailed fee calculation including a depreciation cost). In the present embodiment, the information used for this fee calculation is the cost information 508 of the device information 500 of FIG. 5AA, which is managed at the management server 101 (by default, these are the same values as the cost information 542 of FIG. 5AE).

In the present embodiment, the fee information 530 is assumed to be items for which the service provider is able to set money amounts (profit amounts). Also, for the cost information 550, it is assumed that, for each model, fees corresponding to print settings and attributes of the image data, which is the target of the printing, are allocated by default. Note that no particular limitation is made for items for which the service provider sets the money amount.

Specifically, in the case of an electrophotographic method, for example, a formula for calculating cost fees is: printing cost C1=toner fee+sheet fee+depreciation cost.

A formula for calculating the toner fee is, for example: toner fee=(number of sheets to be printed)×Σ{(toner usage amount for each color)×(toner unit price for each color).

The toner usage amount for each color can be obtained from a printing ratio based on the size of the printing sheet, the type of the image data, and the image data, for example. In the present embodiment, because the print data is stored in the mobile terminal 104, the toner usage amount is obtained at the mobile terminal 104. This processing is executed at the image size calculation unit 324. The approach to calculating the toner usage amount may use a conventional technique, such as one that uses a pixel count, or a new algorithm may be prepared. Accordingly, a detailed explanation will be omitted here. Also, the toner usage amount may be simply obtained from the file type of the print data, or the print data may be expanded into bitmaps for each color, after which the number of dots for each coloring material may be counted.

The formula for calculating the depreciation cost is, for example: depreciation cost=(depreciation cost unit price)×(number of sheets printed)×(double/single sided printing coefficient)×(media type coefficient)×(media size coefficient)×(mode coefficient)×(number of pages coefficient for 1 job).

For example, the conveying path of the sheet is changed in accordance with whether it is double-sided printing or single-sided printing. Generally, with double-sided printing the intervals between sheets that are consecutive during the image forming are more spread out than with single-sided printing. When the intervals between sheets are spread out, because the image forming apparatus is operating during these intervals, depreciation advances. The calculation equation is set so that this is reflected in the depreciation cost. Additionally, for the depreciation of the image forming apparatus, various parameters are involved, such as those related to the usage region of a fixing unit changing according to the size of the sheets, to the part of the engine that is used being different for color and monochrome, and the rotation interval proportionally divided for a single print being reduced in accordance with the continuous printing sheet number increasing. For these reasons, the main body depreciation conditions change, and so, the depreciation cost fluctuates in accordance with the print settings, or the like. Note that, for the above described calculation, each depreciation coefficient is multiplied by the depreciation unit price encompassing the whole, but the calculation equation may differ depending on the characteristics of the actual device configuration, and the various units, and it is not limited to this calculation.

In the present embodiment, the image size is calculated on the side of the mobile terminal 104, but the image size may be calculated on the management server 101 side. In such a case, it is necessary to send the image data to the management server 101. For this reason, a configuration may be taken such that it is possible to set appropriately which side calculates the fees of which portions in view of the processing loads of the mobile terminal 104 and the management server 101, the communication load, or the like. Also, when an apparatus other than the mobile terminal 104 holds the printing target image data, the management server 101 obtains the image data from this apparatus that holds it, and then calculates the image size. The sheet fee and the depreciation cost can be obtained from print setting information. By taking this kind of fee calculation configuration, the service provider can tack on a fee to the printing cost, such as a toner consumption fee or a sheet fee, as appropriate, and can ensure a profit reliably.

The calculation of the fee on the management server 101 side is performed based on image size data received from the mobile terminal 104, print settings, information of the image forming apparatus 105 and the fee information 530, and the model information 540 (or the cost information 508). Note that the infrastructure usage fee (or the intermediary fee for printing), and the fee for the clearance system 2 are included.

The specific calculation method may be, for example: printing cost C2=(toner fee+sheet fee+depreciation cost+fee+usage fee)×(1+fee (rate))×(1+tax rate).

Processing Upon Print Service Usage

Explanation will be given for the processing and user interface (UI) for when the print service according to the present embodiment is used.

Note that, in the present embodiment, it is envisioned that the locations of the service user (the mobile terminal 104) and the service provider (the image forming apparatus 105) can be changed in accordance with the situation. For this reason, the image forming apparatus 105 can provide its own location to the management server 101 periodically, and the mobile terminal 104 can reference that location information. Note details of a technique of superimposing the current location information on an image of a map, which is explained below, will be omitted as they use conventional techniques.

Figure 7B:
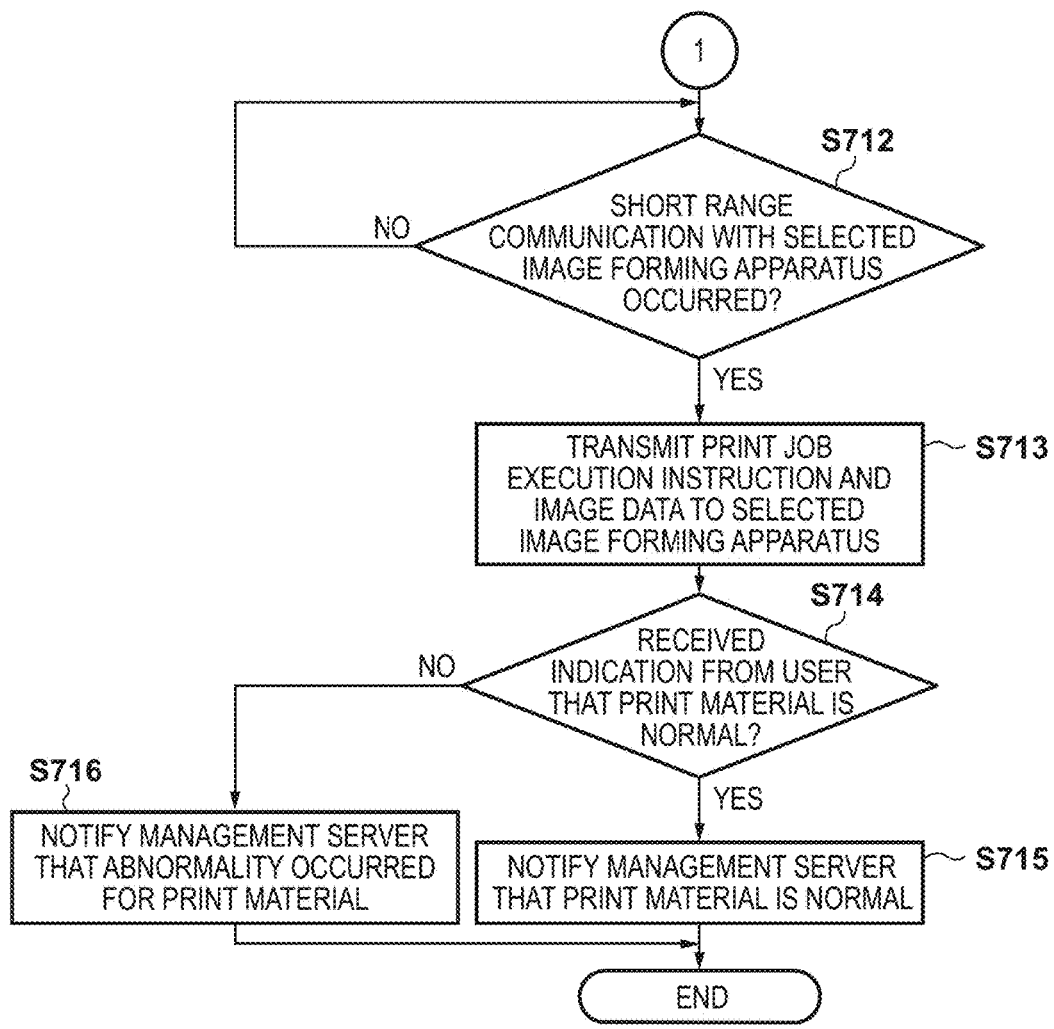

FIGS. 7A and 7B show a flow when the service user uses the print service via the mobile terminal 104. This processing flow extracts the processing on the side of the mobile terminal 104 (the service user) shown in FIGS. 4A and 4B. Also, FIG. 8AA to FIG. 8CB show example configurations of UIs displayed on the display unit 216 of the mobile terminal 104 in accompaniment of the usage of the print service.

In step S701, the mobile terminal 104 activates the application 322 based on a user instruction, and displays a UI screen 800 (FIG. 8AA) that is for using the print service.

In step S702, when a button 801 on the mobile terminal 104 is pressed, a screen for selecting 810 (FIG. 8AB) images that can be printed is displayed, and a selection of the printing target image from out of the images that can be printed is received from the user.

In step S703, the mobile terminal 104 displays a print setting screen 820 (FIG. 8AC) after receiving the selection of the printing target image, and print settings in relation to the selected image are received from the user.

In step S704, the mobile terminal 104 instructs a search for candidate image forming apparatuses (image forming apparatus by which the printing target can be obtained). The search here can be considered to be of an approach in which a query to the management server 101 is performed based on the print settings, for example, and information of the device information DB 302 is used via the device searching unit 301.

In step S705, the mobile terminal 104 calculates the image size of the image that is selected. Furthermore, the mobile terminal 104, using the calculated image size of the image, coordinates with the management server 101 to calculate the printing fee. The details of the processing will be explained later using FIG. 9.

In step S706, the mobile terminal 104 displays a screen for selecting 830 (FIG. 8AD), and receives a designation of the approach for selecting the image forming apparatus 105. If an instruction indicating that the image forming apparatus 105 is selected from a map is received via the screen for selecting 830 (YES in step S706), in step S707, the mobile terminal 104 displays a screen for selecting 840 (FIG. 8BA). If an instruction indicating that the image forming apparatus 105 is selected from a list is received via the screen for selecting 830 (NO in step S706), the mobile terminal 104, in step S708, displays a selection screen 850 (FIG. 8BB) or a selection screen 860 (FIG. 8BC) based on the designated instruction.

In step S709, the mobile terminal 104 receives the selection of the image forming apparatus 105 via the screen for selecting that is displayed in step S707 or in step S708. According to the present embodiment, the image forming apparatus that is output (that is used) can be easily selected because the user can easily recognize image forming apparatuses at candidate locations, as well as the printing fees corresponding to those apparatuses.

In step S710, the mobile terminal 104 displays a details screen 870 (FIG. 8BD) based on the print settings received in step S703 and the information of the image forming apparatus selected in step S709.

In step S711, when the mobile terminal 104 is instructed by the user that the print content is finalized via the details screen 870, the print content is transmitted to the management server 101 as a print instruction. Here, the mobile terminal 104 receives a notification indicating that the print job was issued from the management server 101 as a response to the print instruction. In this notification, for example, a job identifier and an image identifier are included.

In step S712, the mobile terminal 104 displays an instruction screen 880 (FIG. 8CA) and stands by until it detects that short range communication with the image forming apparatus 105, which is selected in step S709, becomes possible.

Regarding the detection here, it can be detected that the short range communication between the short range communication control units 218 and 229 becomes possible when, for example, the user moves close to the image forming apparatus 105 that was selected and holds up the mobile terminal 104 to it.

In a case when it is detected that short range communication is possible (YES in step S712), the mobile terminal 104, in step S713, transmits image data to be used in the print job and an execution instruction that includes a received job identifier, which was received from the management server 101, to the image forming apparatus 105. When a plurality of data items (files) are associated with a single job identifier, continuous transmitting of the plurality of data items (files) is performed. As described above, it is possible to use short range communication for transmitting the image data, and it is possible for transmission of image data to use a handover for performing the transmission over wireless LAN.

In step S714, the mobile terminal 104, after transmission of various information in step S713 is complete, displays a confirmation screen 890 (FIG. 8CB), and receives, from a user, a confirmation result as to whether or not a printed material output from the image forming apparatus 105 is normal. When a confirmation result indicating that the user confirms that the output material is normal is received (YES in step S714), in step S715 the mobile terminal 104 notifies the management server 101 that the printed material is normal. When a confirmation result indicating that an abnormality, such as a printing mistake, has occurred for the output material is received (NO in step S714), in step S716 the mobile terminal 104 notifies the management server 101 that an abnormality has occurred for the printed material. With the above, this processing flow is terminated.

User Interface

Figure 8A:
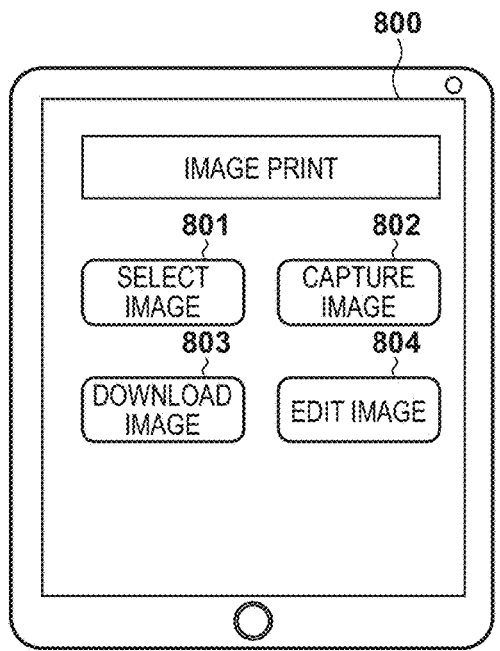
FIGS. 8AA, 8AB, 8AC, and 8AD are views for illustrating example configurations of UI screens displayed on a mobile terminal according to the first embodiment.
Figure 8A:
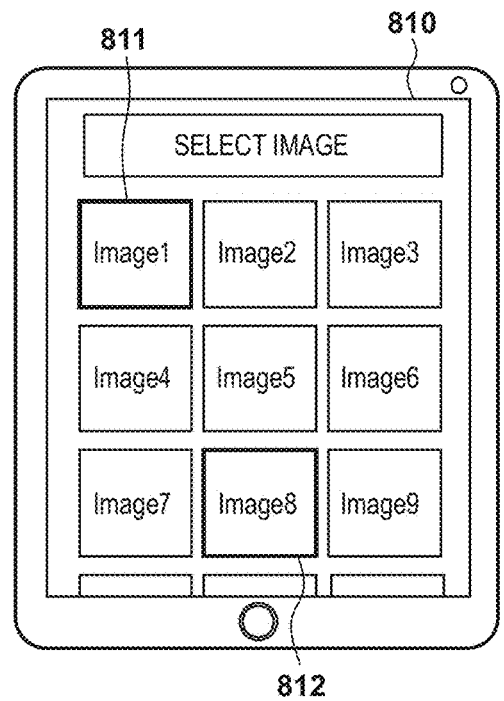
Figure 8A:
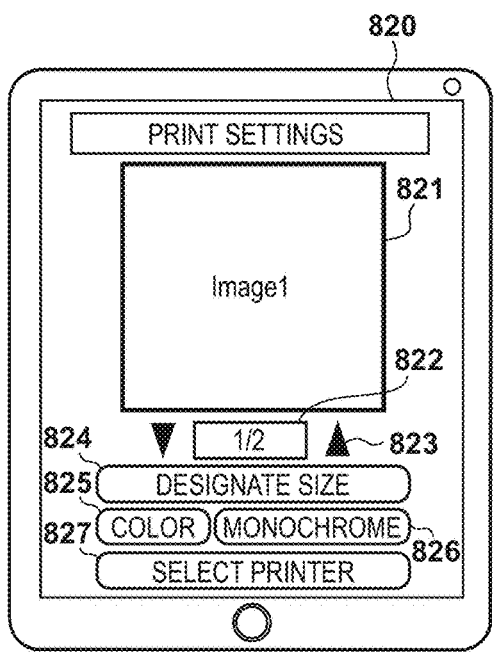
Figure 8A:
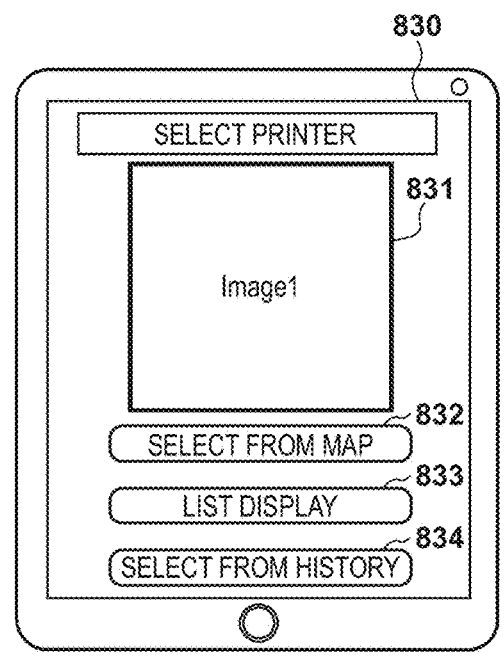
Figure 8B:
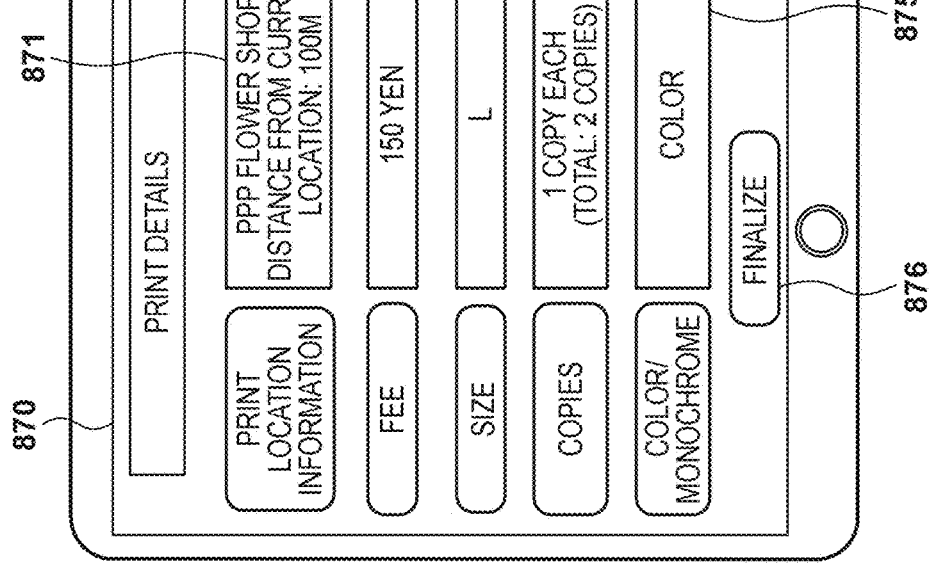
FIGS. 8BA, 8BB, 8BC, and 8BD are views for illustrating example configurations of UI screens displayed on a mobile terminal according to the first embodiment.
Figure 8B:
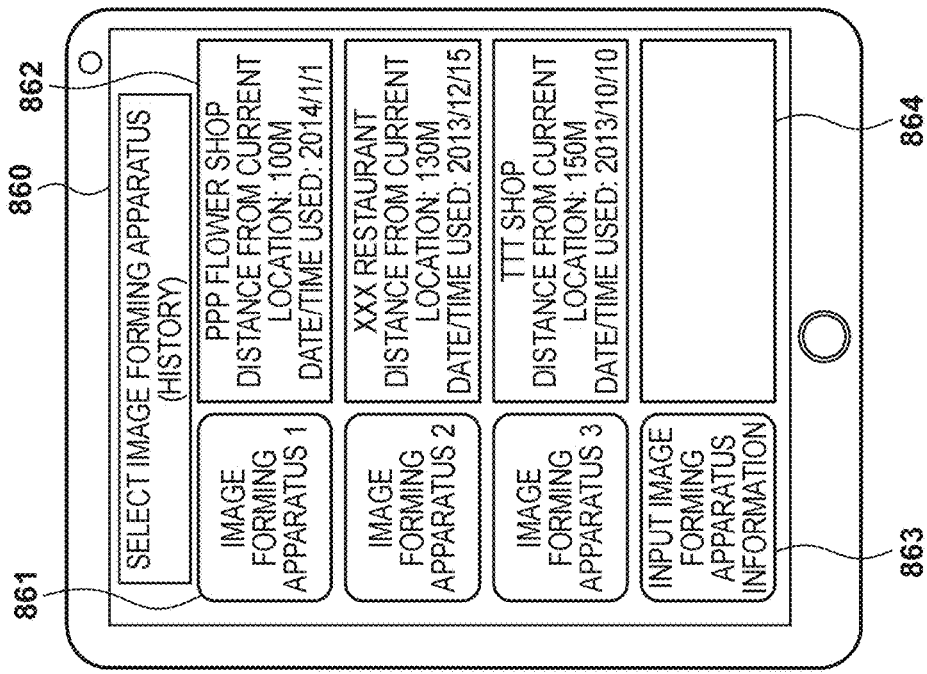

An explanation is given using FIG. 8AA to FIG. 8CB for an example configuration of UIs displayed to the mobile terminal 104 at a timing shown in the explanation of FIGS. 7A and 7B when using the print service according to the present embodiment.

FIG. 8AA is the UI screen 800 that is displayed when the application 322 of the mobile terminal 104 is activated to use the print service. The UI screen 800 comprises the button 801 for selecting an image, a button 802 for newly capturing an image by the camera 217, a button 803 for downloading an image from an external apparatus, and a button 804 for editing an image. Additionally, a detailed explanation of functions for the buttons 802-804 will be omitted as they are realized using functions arranged in the OS 321. When the button 801 is pressed, a transition occurs to the screen for selecting 810 shown in FIG. 8AB.

FIG. 8AB is the screen for selecting 810 that is for selecting a printing target image. For the screen displayed here, a configuration may also be taken to display image data that is maintained in an external apparatus, such as the management server 101, in addition to the images maintained inside the mobile terminal 104. For the example shown in FIG. 8AB, images 811 and 812 are selected.

FIG. 8AC is the print setting screen 820 that has a setting region for designating print settings when printing an image. A region 821 displays an image of the target of the printing that is selected in the screen for selecting 810. A region 822 indicates a total number of sheets of the selected images, and what number in the sheets the image displayed on the region 821 (the image for which print settings are currently being performed) corresponds to. A button 823 is a button for performing switching of an image for performing print settings. Buttons 825 and 826 are buttons for designating color printing/monochrome printing. A button 827 is a button for finalizing the print settings, and transitioning to the screen for selecting 830 for selecting an image forming apparatus for performing the printing.

FIG. 8AD is the screen for selecting 830 that is for selecting an image forming apparatus for performing the printing. On a region 831, an image of a printing target is displayed. A button 832 is a button for searching the vicinity for an image forming apparatus, and transitioning to the screen for selecting 840 (FIG. 8BA) that displays information of detected image forming apparatuses overlappingly on the map. A button 833 is a button for the mobile terminal 104 searching for image forming apparatuses based on the print settings, and for transitioning to the selection screen 850 (FIG. 8BB) that displays a list of results. A button 834 is a button for transitioning to the selection screen 860 (FIG. 8BC) for designating an image forming apparatus that the user used in the past or directly designating an image forming apparatus. Additionally, the screen for selecting 830 can also comprise, in addition to these buttons, a search region for designating a search condition for searching for image forming apparatuses.

FIG. 8BA overlaps associated information and a position of detected image forming apparatuses based on the print settings, and the like, onto a map, and displays a selection region by which user can make a selection. On a region 841, peripheral map information based on location information of the mobile terminal 104 is displayed, for example. An icon 842 indicates a location of an image forming apparatus that can support the designated print settings. The user can select the image forming apparatus by pressing the icon 842. An icon 843 displays information relating to the image forming apparatus. The icon 843 includes the fee information required for printing. Also, in the screen for selecting 840, a configuration may be taken such that image forming apparatuses that cannot execute the printing corresponding to the designated print settings are not displayed, or a configuration may be taken to display such image forming apparatuses, but to also display that printing cannot be performed for the print settings. Also, a configuration may be taken to also display a distance and time required to move to the respective image forming apparatus from the current location of the mobile terminal 104, and processing time required for printing. Also, a configuration may be taken such that, when the icon 843 is pressed, more detailed information is displayed. Also, a configuration may be taken such that the display of the icon 843 is switched depending on the display content, for example, causing a location for the lowest price to blink, or changing a color of the display.

FIG. 8BB is the selection screen 850 that displays a list of image forming apparatuses that can support the designated print settings. A button 851 indicates an image forming apparatus, and, by pressing it, the image forming apparatus can be selected. A region 852 indicates information of the image forming apparatus.

FIG. 8BC is the selection screen 860 that is a list of image forming apparatuses used in the past by the user, and that is for directly designating an image forming apparatus. A button 861 indicates an image forming apparatus that was used in the past, and, by pressing it, the image forming apparatus can be selected. A region 862 indicates information of the image forming apparatus. Also, it is possible to designate a particular image forming apparatus when information of the image forming apparatus that is desired to be selected is known in advance, by inputting this information into a region 864, and pressing a button 863. Also, for selection screens 850 and 860 of FIG. 8BB and FIG. 8BC, a configuration may be taken such that the screen of FIG. 8BA is transitioned into when an image forming apparatus is selected such that the location of the selected image forming apparatus can be known.

FIG. 8BD is the details screen 870 displaying detailed information of print content after an image forming apparatus is selected. Setting details 871-875 display print settings that have been designated up until now. When a button 876 is pressed, content of print settings is finalized, and the instruction screen 880 of FIG. 8CA is transitioned into.

FIG. 8CA is the instruction screen 880 in which the mobile terminal 104 waits until short range communication is performed between the mobile terminal 104 and the selected image forming apparatus 105, and the instruction screen 880 instructs the user to approach the selected image forming apparatus.

FIG. 8CB is the confirmation screen 890 for receiving, from a user, an instruction as to whether or not an output printed material is normal, after a print job is executed. A button 891 is a button that is pressed when a printed material is normal. A button 892 is a button that is pressed when an abnormality, such as a print failure, occurs.

Fee Calculation Processing Flow

An explanation will be given for a detailed flow of the fee calculation processing for step S705 of FIG. 7A using FIG. 9. This processing flow is realized by the CPUs of the management server 101 and the mobile terminal 104 reading and executing a program stored in a storage unit according to the present embodiment.

In step S901, the mobile terminal 104 obtains print settings received from a user.

In step S902, the mobile terminal 104 calculates an image size based on print data of a printing target and the print settings.

In step S903, the mobile terminal 104 transmits, to the management server 101, the print settings and information of the image size calculated in step S902.

In step S904, the management server 101 receives the information of the image size and the print settings from the mobile terminal 104.

In step S905, the management server 101 obtains the fee information from the fee information DB 308 based on the obtained print settings. At this time, the management server 101 obtains fee information for image forming apparatus candidates that can print according to the print settings for which the search was instructed by the mobile terminal 104 in step S704 of FIG. 7A.

In step S906, the management server 101 calculates a printing fee for each detected image forming apparatus, based on the obtained print settings, the fee information for the extracted image forming apparatuses, and the obtained information of the image size.

In step S907, the management server 101 transmits the calculated printing fee for each image forming apparatus to the mobile terminal 104 in step S907.

In step S908, the mobile terminal 104 receives the printing fees calculated by the management server 101. Here, the mobile terminal 104 displays a received printing fee to a selection screen of FIG. 8BA and FIG. 8BB. With the above steps being performed, this processing flow is terminated.

With the above processing, a service provider can easily introduce a print service and charging management becomes easy. Also, the service user can use the print service easily and the convenience of the print service is improved.

Additionally, while in the present embodiment, the charging server 102 performs the clearance processing all at once, a configuration may be taken such that processing for fee payment towards the service provider who is the owner of the image forming apparatus is also performed. Also, a configuration may be taken such that, in a case when administrators of the charging server 102 and the management server 101 are different, the charging server 102 may perform processing for fee payment towards the management server 101.

Second Embodiment

In the first embodiment the configuration is one in which communication between various apparatus and an image forming apparatus is performed by a part that is installed inside the image forming apparatus. In the present embodiment, an explanation is given for an example using a configuration in which this part is externally-attached rather than internal to the image forming apparatus, as in the above described configuration. Additionally, an explanation will be omitted of portions that duplicate the first embodiment.

System Configuration

FIG. 10 is an example of a system configuration according to the present embodiment. A difference with the first embodiment is the configuration of an image forming apparatus 1001. The image forming apparatus 1001 is a general-purpose image forming apparatus that alone function cannot as the image forming apparatus of the print service according to the present application invention. In the present embodiment, a device 1002 is connected to the image forming apparatus 1001 enable the provision of the print service of the present application invention.

Hardware Configuration

FIG. 11 is a view for showing an example of hardware configurations of the device 1002 and the image forming apparatus 1001 according to the present embodiment. A CPU 1101 controls the image forming apparatus 1001 on the whole. The CPU 1101 reads various programs stored in a ROM 1102 or a RAM 1103, and, by executing the programs, executes a process for image formation.

The ROM 1102 is a nonvolatile storage unit and stores various programs. The RAM 1103 is a volatile storage unit and, for example, is used as a work memory for processing of the CPU 1101. An HDD 1104 is a nonvolatile storage unit and stores various programs and holds the results of processing. A network I/F 1105 performs communication with an external apparatus through the network 103, or the like (mainly by a wired connection). A display unit 1106 functions as a user interface and displays various information to a user. Also, the display unit 1106 functions as an interface, such as a touch panel, and receives operations from the user. A scanner unit 1107 is a reading apparatus, and performs reading of an original, or the like, based on a user instruction, or the like. A printer unit 1108 is a printing apparatus and based on a print job performs printing of an image and performs outputting of a printed material. An I/F 1109 is connected with the device 1002, and performs transmitting/receiving of various data with the device 1002. Here, so long as the I/F 1109 is able to connect to the device 1002, it does not particularly matter whether the connection method is wired/wireless. Also, each configuration element within the image forming apparatus 1001 is connected to be able to communicate with each other.

The device 1002 comprises a processing unit 1111, an I/F 1112, a short range communication control unit 1113, and a WiFi control unit 1114. A processing unit 1111 executes each process of an image forming apparatus described in the first embodiment. More specifically, the processing unit 1111 performs management of print jobs received in step S410 of FIG. 4A, reception of job execution instructions, user information and job information in step S413, and notification of execution results for print jobs in step S418 and step S419. Also, inside of the processing unit 1111 is held data that corresponds to the user information DB 314 and the payment information DB 313. Additionally, a configuration may be taken such the processing unit 1111 cooperates with the CPU 1101 and the HDD 1104 inside the image forming apparatus 1001 to execute and to perform control of various processing and various information. The short range communication control unit 1113 performs an operation equivalent to the short range communication control unit 218 of the first embodiment. The WiFi control unit 1114 is for controlling communication by Wi-Fi®, and performs operation equivalent to the WiFi control unit 230 of the first embodiment. Also, each configuration element within the device 1002 is connected to be able to communicate with each other.

The main body recognizes that the device 1002 (adapter) is mounted, and, by activating a function relating to the present system that is embedded in advance in main body firmware (FW), an exchange of information required for the present system is performed. In a case when the function is not embedded in the main body FW in advance, there is a function for rewriting the FW of the main body.

For various processes, an explanation is omitted due to various processes being the same with the first embodiment.

According to the present embodiment, in addition to the effects of the first embodiment, a print service of the present application invention can be provided using an image forming apparatus that is already widely used.

FIG. 13A is a conceptual diagram for showing the performance of processing steps in a characteristic part of the present invention for the printing system in which the present invention is applied. Twelve characteristic processing steps are given as examples in the "steps" shown in columns within FIGS. 13A and 13B. Also, an "o" is recited when the "mobile terminal" or the "management system" shown in the columns are the performers of the corresponding processing step.

For example, in FIG. 13A, a step of image size calculation by print data analysis is shown to be a step executed by the mobile terminal. Additionally, in FIGS. 13A and 13B, apparatuses other than the mobile terminal in the system configuration of FIG. 1 are described collectively as "management system". Here, FIG. 13A corresponds to the processing sequence shown in the previously described FIGS. 4A and 4B.

FIG. 13B shows a variation of FIG. 13A. Specifically, it shows an example of a case when the mobile terminal uses the printing system of the present invention having transferred print data to the management system without performing print data analysis of the printing target. Besides this, it is also an example for when the mobile terminal selects data managed in advance by the management system as the printing target print data. As shown in FIG. 13B, in such a case, it is understood that processing steps 2 and 3 are executed by the management system. In a case when the system side transmits print data, when a plurality of data (files) are associated with a single job identifier, collecting this data into a single file, and transmitting it as the print data is possible. Here, the file format used for transmission is for example, portable document format (PDF) or Joint Photographic Experts Group (JPEG), and it is possible to use a desired format that can be supported on the printer side that is the output target.

Third Embodiment

In the above described first and second embodiments, an image forming apparatus connects to a network and performs reception of a print job (step S409 of FIG. 4A), and confirms a user (step S413-step S415). A similar service that does not go through a network is, however, possible. In such a case, a service provider sets authentication information (a password or the like) specific to a device for the device information of FIG. 5AA. Also, similar authentication information is set for an image forming apparatus. In the embodiment explained in the second embodiment in which the device 1002 is connected as an adapter, authentication information is set for the device 1002.

Job issuance is performed in step S408 of FIG. 4A. On the other hand, in the present embodiment, in step S410 rather than in step S409, a job including authentication information of an image forming apparatus is communicated to the mobile terminal 104. In the present embodiment, a configuration is taken such that a job is not transmitted in step S409.

The mobile terminal 104 initiates short range communication with the image forming apparatus 105 in step S412 when, in step S411, the mobile terminal 104 is able to initiate short range communication with the image forming apparatus 105. Then, the mobile terminal 104, using this communication, transmits user information of the mobile terminal 104, print data and the job information received in step S410. The image forming apparatus, having received the job information, executes the job in step S416, in a case when authentication information included in this job information matches its own authentication information. As a result, in the present embodiment, the processing of step S413 to step S415 is not performed. Also, the ensuing processing is similar to FIGS. 4A and 4B. Step S418 and step S427 are not, however, performed.

By virtue of the present embodiment, it is not necessary for an image forming apparatus to connect to a network, and furthermore, a degree of freedom of a service provider increases. Additionally, in order for the management server 101 to manage a status of an image forming apparatus, it is advantageous to connect to a network. In such a case as well, however, it is not necessary to perform the receiving of a job. Also, in a case when the adapter scheme of the second embodiment is employed, it is possible to realize the embodiment without changing the main body FW of the image forming apparatus. Also, in a case when a plurality of image forming apparatuses within a printing system are included, the configurations of the embodiments described above may be mixed.

Additionally, for the printing system, it is desirable for an agreement to be formed for the following contract conditions between the service user (user) and the service provider and the service provider (infrastructure operator) of the printing system, to allow for a smooth transaction relationship.

For each embodiment described above, a buying and selling contract for printing that involves a seller and a buyer of a printed material is established between a service user and a service provider, and the service user orders printing using pay-as-you-go fees, and reception of the printed material occurs at a store of the service provider. This buying and selling contract is established each time a printing request (job) is instructed. It is desirable, however, for a procedure for establishing a contract to be clearly recited in the contract, and, when installing an application of the printing system on the mobile terminal, it is desirable to obtain consent to the contract from the service user.

Between the service provider and the system provider, an infrastructure (system) usage contract of the present system is established, the service provider pays infrastructure usage fees by pay-as-you-go fees, and the system provider performs advertisement of stores of the service provider and the system. This usage contract may be entered into when the service provider registers information of an image forming apparatus, and the like, to the system. Additionally, entering a maintenance service contract and a buying and selling contract for an image forming apparatus and its consumable parts between both parties is even more desirable.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A method of controlling a printing system in which a mobile terminal and a plurality of image forming apparatuses are connectable to a management system and a charging system via a network, the method comprising:
  in the management system, authenticating that a user of the mobile terminal is a registered user of the printing system;
  in the charging system, for charging payment for a print service provided using an image forming apparatus, of the plurality of image forming apparatuses, by one or more service providers, confirming that clearance processing of the user of the mobile terminal is possible;
  in the mobile terminal, displaying, on a screen, a setting region for inputting a print setting for print data, and a search region for inputting a search condition for image forming apparatus candidates, of the plurality of image forming apparatuses, for executing printing;

in the management system, searching for one or more image forming apparatuses, out of the plurality of image forming apparatuses, in accordance with the search condition input in the search region of the screen displayed in the mobile terminal;

in the mobile terminal, displaying display content that associates information of the one or more image forming apparatuses with charge information for when the print data is printed by the one or more image forming apparatuses, respectively, on a screen that includes a selection region by which it is possible to select a printing target, out of the one or more image forming apparatuses found in the searching, wherein the charge information is calculated based on at least (i) cost fees according to the respective image forming apparatuses, which are necessary if the print data is printed, obtained by the input print setting, and (ii) an additional fee required by a service provider, of the one or more service providers, of the respective image forming apparatuses;

in the mobile terminal, transmitting, to the management system, a print instruction that includes information of an image forming apparatus selected as the printing target in the selection region;

in the management system, issuing a print job including information by which it is at least possible to identify the print instruction that is for the image forming apparatus selected as the printing target if the clearance processing of the user is possible;

in the image forming apparatus selected as the printing target, outputting printed material by printing the print data based on the issued print job; and in the management system, making a request for clearance processing, based on the charge information, to the charging system after the outputting of the printed material.

2. The method of controlling a printing system according to claim 1, wherein the mobile terminal and the plurality of image forming apparatuses each comprise a short range communication unit capable of short range communication, wherein, in the outputting, in accordance with the mobile terminal becoming able to perform short range communication with the selected image forming apparatus via the respective short range communication units, the print data is printed by transmitting an execution instruction for the print job to the selected image forming apparatus from the mobile terminal; and wherein the request for the clearance processing is made (i) after reception of a completion notification of the outputting from the image forming apparatus selected as the printing target, and (ii) after reception of a confirmation notification for the printed material from the mobile terminal.

3. The method of controlling a printing system according to claim 2, wherein, in the outputting, the mobile terminal transmits the print data and the execution instruction to the selected image forming apparatus using the respective short range communication unit.

4. The method of controlling a printing system according to claim 3, wherein the mobile terminal and the plurality of image forming apparatuses each comprise a communication unit for performing public wireless communication, and wherein, in the outputting, in order to set a communication parameter for the public wireless communication, the mobile terminal transmits the print data to the selected image forming apparatus via the communication unit in the mobile terminal, and the image forming apparatus receives the print data using the short range communication unit.

5. The method of controlling a printing system according to claim 1, further comprising:

in the mobile terminal, transferring print data of the printing target to the management system; and in the management system, performing image processing on the transferred print data and transferring a result of the image processing to the selected image forming apparatus.

6. The method of controlling a printing system according to claim 1, wherein, in the mobile terminal, a region for selecting print data, the setting region, and the search region are displayed on the same screen.

7. The method of controlling a printing system according to claim 1, wherein each of the cost fees is calculated based on a coloring material cost, a sheet cost, and costs of depreciation of the respective image forming apparatuses, which are necessary if the print data is printed, obtained by the print setting of the one or more image forming apparatuses, respectively.

8. The method of controlling a printing system according to claim 7, wherein the cost of the coloring material is calculated based on an image size and a standard unit price of a coloring material used by the respective image forming apparatus when the print data is printed by the print setting.

9. The method of controlling a printing system according to claim 7, wherein, out of the charge information, at least the cost of the coloring material is calculated from a number of dots of the print data, which is calculated based on the print data that is stored in the mobile terminal.

10. The method of controlling a printing system according to claim 1, wherein the charge information is calculated in the management system and is transmitted to the mobile terminal.

11. The method of controlling a printing system according to claim 1, wherein the print data is selected from files stored in the mobile terminal.

12. The method of controlling a printing system according to claim 1, wherein the print data is selected from files stored in the management system.

13. The method of controlling a printing system according to claim 1, wherein, in the mobile terminal, the display content that associates information of the one or more image forming apparatuses is displayed on an image of a map, and the charge information for when the print data is printed by the one or more image forming apparatuses, respectively, is superimposed when displaying the screen that includes the selection region by which it is possible to select the printing target out of the one or more image forming apparatuses searched for in the searching.

14. The method of controlling a printing system according to claim 1, wherein, in the mobile terminal, a distance from a current location of the mobile terminal to a location of the one or more image forming apparatuses is displayed on an image of a map when displaying the screen that includes the selection region by which it is possible to select the printing target, out of the one or more image forming apparatuses searched for in the searching.

15. The method of controlling a printing system according to claim 1, wherein information used for calculating the charge information is registered when an image forming apparatus, of the plurality of image forming apparatuses, is registered to the management system.

16. The method of controlling a printing system according to claim 1, wherein, in the charging system, when the clearance processing is requested in the requesting, the clearance processing is performed based on the charge information for the user of the mobile terminal.

17. The method of controlling a printing system according to claim 1, further comprising:
   in the mobile terminal, displaying a buying and selling contract corresponding to printing in a relationship between a buyer and a seller of the printed material, wherein the relationship is between the user of the mobile terminal and a service provider, of the one or more service providers, of the image forming apparatus; and
   in the image forming apparatus, displaying a usage contract for the printing system that is between the service provider of the image forming apparatus and an administrator of the printing system.

18. The method of controlling a printing system according to claim 1, wherein the image forming apparatus is installed at at least one of a retail shop, a restaurant, and an event site.

19. A printing system in which a mobile terminal and a plurality of image forming apparatuses are connectable to a management system and a charging system via a network, wherein the management system comprises at least one memory that stores instructions, and at least one processor configured to execute the instructions to function as:
   (a) an authentication unit configured to authenticate that a user of the mobile terminal is a registered user of the printing system;
   (b) a search unit configured to search for one or more image forming apparatuses, out of the plurality of image forming apparatuses, in accordance with a search condition input in the mobile terminal;
   (c) an issuance unit configured to issue a print job including information by which a print instruction to an image forming apparatus, which is selected as a printing target can be identified; and
   (d) a requesting unit configured to request clearance processing based on charge information to the charging system after outputting of a printed material by the selected image forming apparatus,
   wherein the charging system for charging payment for a print service provided using an image forming apparatus, of the plurality of image forming apparatuses, by one or more service providers, comprises at least one memory that stores instructions, and at least one processor configured to execute the instructions to function as:
   (a) a confirmation unit configured to confirm that the clearance processing for the user of the mobile terminal is possible; and
   (b) an execution unit configured to execute the clearance processing in accordance with the request from the management system,
   wherein the mobile terminal comprises at least one memory that stores instructions, and at least one processor configured to execute the instructions to function as:
   (a) a display unit configured to display (i) a setting region, on a screen, for inputting a print setting for print data, and a search region for inputting a search condition for image forming apparatus candidates, of the plurality of image forming apparatuses, for executing printing, and (ii) display content that associates information of the one or more image forming apparatuses, searched for by the search unit of the management system, with charge information for when the print data is printed, by the print setting, on the one or more image forming apparatuses, respectively, on a screen that includes a selection region by which it is possible to select a printing target, out of the one or more image forming apparatuses, wherein the charge information is calculated based on at least (i) cost fees according to the respective image forming apparatuses that are necessary if the print data is printed, obtained by the print setting, and (ii) an additional fee required by a service provider, of the one or more service providers, of the respective image forming apparatuses; and
   (b) a transmission unit configured to transmit, to the management system, a print instruction that includes information of an image forming apparatus selected as the printing target in the selection region, and
   wherein each the image forming apparatus, of the plurality of image forming apparatuses, comprises a printer configured to output printed material by printing the print data based on the issued print job when the image forming apparatus is selected as the target of the printing.

20. The printing system according to claim 19, wherein the mobile terminal and the plurality of image forming apparatuses each comprise a short range communication unit capable of short range communication,
   wherein the at least one processor of the mobile terminal further functions as:
      (c) a transmission unit configured to transmit an execution instruction for the print job, in accordance with a short range communication, to the image forming apparatus via the respective short range communication unit; and
      (d) a confirmation notification unit configured to notify the management system of a confirmation of the printed material output by the printer of the image forming apparatus,
   wherein the image forming apparatus further comprises at least one memory that stores instructions, and at least one processor that executes the instructions to function as a completion notification unit configured to notify the management system of the completion notification for the outputting of the printed material by the printer, wherein the printer prints the print data by the execution instruction for the print job being transmitted from the transmission unit of the mobile terminal, and
   wherein the requesting unit of the management system requests the clearance processing after reception of the completion notification from the completion notification unit of the image forming apparatus and after reception of the confirmation notification from the confirmation notification unit of the mobile terminal.

* * * * *